United States Patent [19]

Nagahashi et al.

[11] Patent Number: 5,970,244
[45] Date of Patent: Oct. 19, 1999

[54] METHOD OF PERFORMING A REVERSE ANALYSIS OF A PROGRAM AND ITS APPARATUS

[75] Inventors: Kenji Nagahashi; Sanya Uehara, both of Kawasaki, Japan

[73] Assignee: Fujitsu Limited, Kawasaki, Japan

[21] Appl. No.: 08/497,088

[22] Filed: Jun. 30, 1995

[30] Foreign Application Priority Data

Jun. 30, 1994 [JP] Japan ................................ 6-148923

[51] Int. Cl.$^6$ ...................................................... G06F 9/45
[52] U.S. Cl. ............................ 395/704; 395/705; 395/707
[58] Field of Search .................................. 395/701, 704, 395/705, 706, 707, 708, 709; 364/280.4, 280.5

[56] References Cited

U.S. PATENT DOCUMENTS

| | | | |
|---|---|---|---|
| 4,667,290 | 5/1987 | Goss et al. ................................ | 364/300 |
| 4,965,724 | 10/1990 | Utsumi et al. .......................... | 364/200 |
| 5,265,253 | 11/1993 | Yamada .................................. | 395/700 |
| 5,437,035 | 7/1995 | Horiuchi et al. ........................ | 395/700 |
| 5,450,585 | 9/1995 | Johnson .................................. | 395/700 |
| 5,491,823 | 2/1996 | Ruttenberg .............................. | 395/700 |

*Primary Examiner*—James P. Trammell
*Assistant Examiner*—Peter J. Corcoran, III
*Attorney, Agent, or Firm*—Staas & Halsey

[57] ABSTRACT

A control flow is prepared by connecting blocks in an execution order, each block not including a branch and comprising a series of statement, based on a syntactical analysis of a program. A second control flow is prepared by cutting the first control flow at one portion and combining the cut result with a symbol designating a loop. A third control flow is prepared by expressing a portion of a loop, branch and merge in the second control flow and the second control flow in a hierarchical manner. The third control flow expresses a portion of a sequential execution other than the loop, branch and merge, a portion of the loop, and a portion of a branch and merge in a hierarchical order by using a symbol for a sequential execution. A specification of the program is extracted by using the third control flow.

16 Claims, 35 Drawing Sheets

| | |
|---|---|
| PRECEDING 2A ELEMENTS (PLURALITY) IN EXECUTION SEQUENCE | 16, 17 |
| FOLLOWING 2A ELEMENTS (PLURALITY) IN EXECUTION SEQUENCE | 19 |
| NEXT 2A ELEMENT IN SEMISEQUENCE | 19 |
| PRECEDING 2A ELEMENT IN SEMISEQUENCE | 16 |
| CONTENT OF PROCESS (OR INFORMATION OF CORRESPONDING ELEMENT IN CONTROL FLOW 1) | 4 |

* 2A - L (14)

| | |
|---|---|
| PRECEDING 24 ELEMENTS (PLURALITY) IN EXECUTION SEQUENCE | - |
| FOLLOWING 24 ELEMENTS (PLURALITY) IN EXECUTION SEQUENCE | 21 |
| NEXT 2A ELEMENT IN SEMISEQUENCE | 21 |
| PRECEDING 2A ELEMENT IN SEMISEQUENCE | - |
| ENTRANCE BLOCK OF LOOP | 1 |
| EXIT BLOCK OF LOOP | 5 |
| LINK WITH 2A ELEMENT ROW DESIGNATION CONTENT OF LOOP | 15 |

* 2B - S (28)

| | |
|---|---|
| 2B ELEMENTS OF CHILD (PLURALITY) | 29, 40, 41, 52 |

* 2B - B (32)

| | |
|---|---|
| 2B ELEMENTS OF CHILD (PLURALITY) | 33, 35 |
| INFORMATION OF CORRESPONDING BRANCHING POINT (LINK WITH 2A ELEMENT) | 15 |

* 2B - U (36)

| | |
|---|---|
| CONTENT TO BE TREATED (OR LINK WITH CORRESPONDING 2A ELEMENT) | 17 |

* 2B - L (29)

| | |
|---|---|
| CORRESPONDING 2A-L ELEMENT | 14 |
| LINK WITH 2B-S LOCATED AT THE TOP OF A PART OF 2B TREE STRUCTURE DESIGNATION CONTENT OF LOOP | 30 |

FIG. 9

| 2A ELEMENT TO BE EXECUTED | LIST OF BRANCHING INFORMATION | CONTENT TO BE EXECUTED |
|---|---|---|
| 21 | [*-28] | PREPARE 40 AND 41, AND ADD THEM TO 28. PREPARE 42 AND 44, AND ADD THEM TO 41. |
| 22 | [41-42] | PREPARE 43, AND ADD IT TO 42. |
| 23 | [41-44] | PREPARE 45 AND 46, AND ADD THEM TO 44. PREPARE 47 AND 49, AND ADD THEM TO 46. |
| 24 | [46-47] | PREPARE 48 AND ADD IT TO 47. |
| 25 | [46-49] | PREPARE 50 AND ADD IT TO 49. |
| 26 | [46-47] [46-49] | REPLACE BY BRANCHING INFORMATION OF MERGED 46(23), AND PREPARE 51, THEREBY ADDING IT TO 44. |
| 27 | [41-42] [41-44] [*-28] | REPLACE BY BRANCHING INFORMATION OF MERGED 41(21), AND PREPARE 52, THEREBY ADDING IT TO 28. |

[NUMBER-NUMBER] REPRESENTS A BRANCHING INFORMATION ELEMENT AND THE LEFT NUMBER SHOWS A BRANCHING POINT 2B-B WHILE THE RIGHT NUMBER A BRANCHING DESIGNATION 2B-S. WHEN THE BRANCHING POINT SHOWS*, IT MEANS THAT THE POINT IS THE UPPER-MOST PART AND A BRANCHING POINT DOESN'T EXIST. AS FOR THE NUMBER OF A CONTROL FLOW ELEMENT, REFER TO THAT OF FIG. 3.

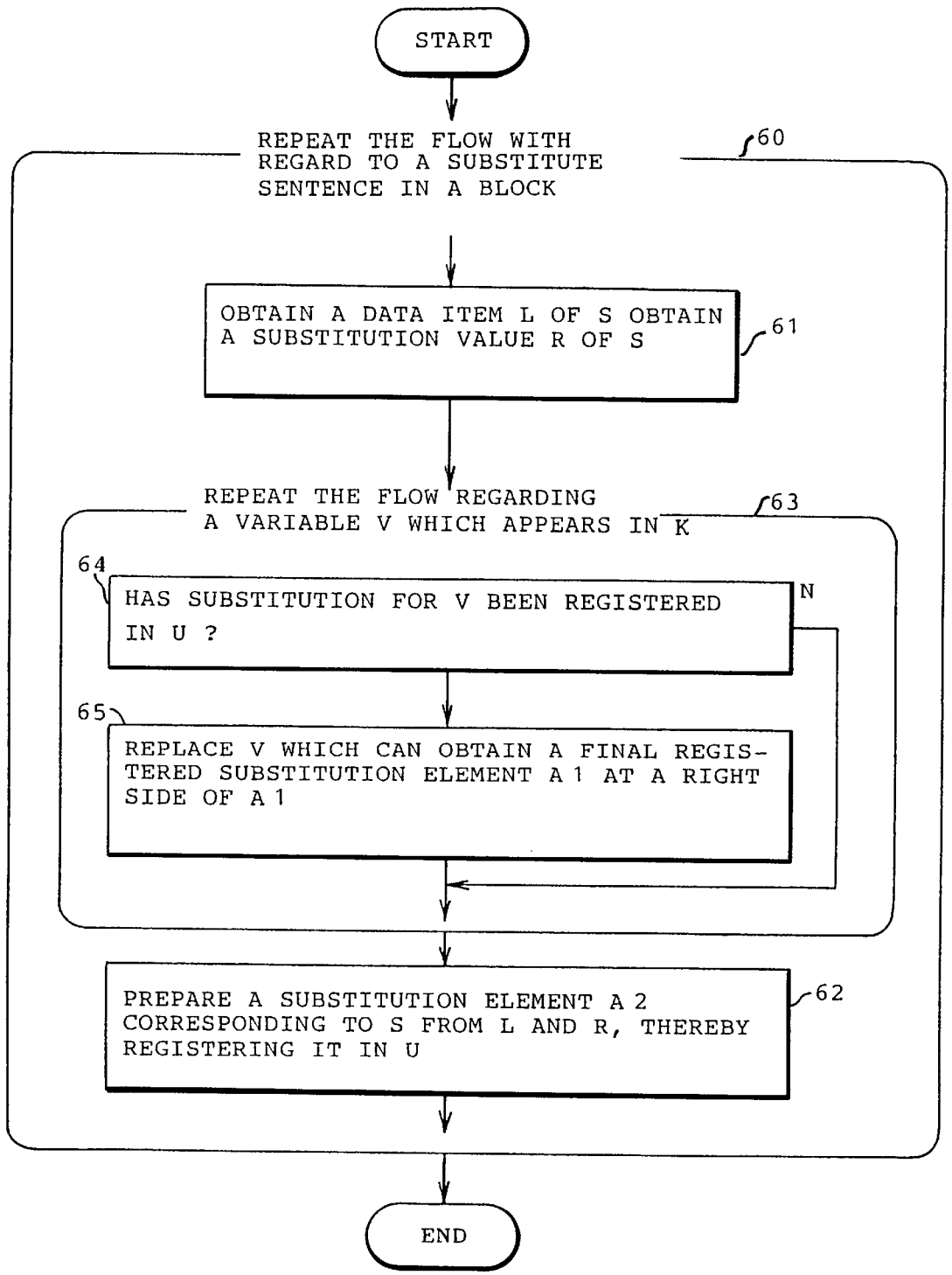

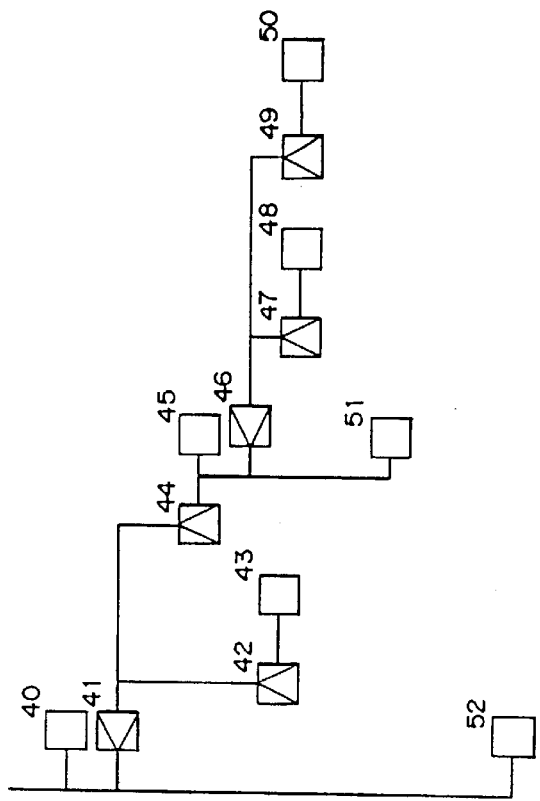
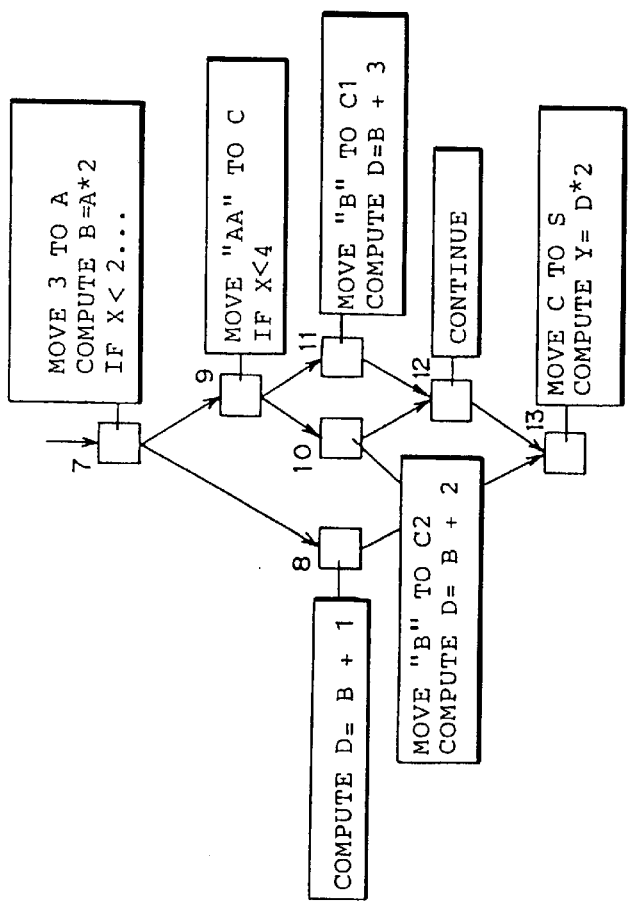
FIG. 12

FIG. 13

| A SUBSTITUTION TABLE OF DATA ITEMS | | |
|---|---|---|
| DATA ITEM | A SUBSTITUTION TABLE | CONDITION |
| A | 3 | |

FIG. 14

| A SUBSTITUTION TABLE OF DATA ITEMS | | |
|---|---|---|
| DATA ITEM | A SUBSTITUTION TABLE | CONDITION |
| A | 3 | |
| B | 3 * 2 | |

FIG. 18

| | | | |
|---|---|---|---|
| A | 3 | | |
| B | 3*2 | | |
| C | "AA" | NOT (X<2) | |
| C1 | "B" | NOT (X<2) AND NOT (X<4) | |
| C2 | "B" | NOT (X<2) AND X<4 | |
| D | 2*3+2 | NOT (X<2) AND X<4 | |
| D | 2*3+3 | NOT (X<2) AND NOT (X<4) | |
| D | 2*3+1 | X<2 | |

Figure 19:
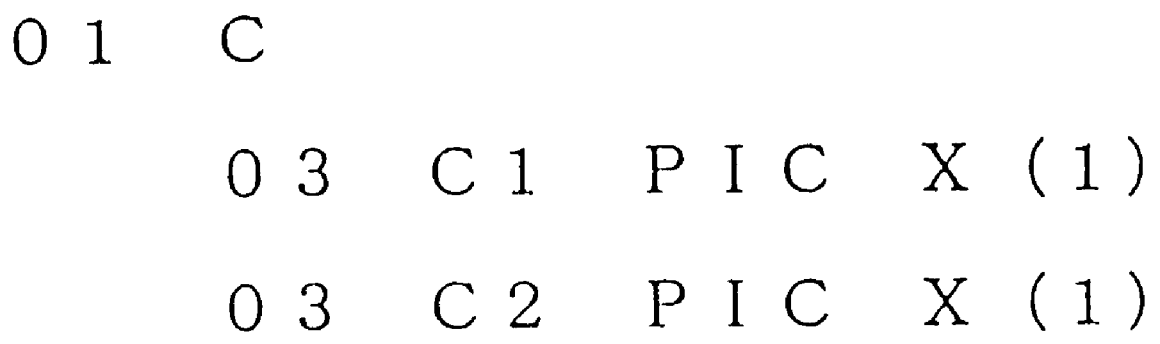

03  C1  PIC  X(1)

03  C2  PIC  X(1)
```

FIG. 28

OUTPUT (SIMPLIFIED RESULTS)

| TITLE | VALUE | CONDITIONAL EXPRESSION |
|---|---|---|
| A 1 | VALUE 1<br>VALUE 2 | CONDITION 1<br>CONDITION 2 |
| A 2 | VALUE 21<br>VALUE 22 | CONDITION 21<br>CONDITION 22 |
| A 3 | VALUE 31<br>VALUE 32 | CONDITION 31<br>CONDITION 32 |
| . | . | . |

RESULTS (DIVISION)

| TITLE | VALUE | CONDITIONAL EXPRESSION |
|---|---|---|
| A 1 | VALUE 11<br>VALUE 12 | CONDITION 1<br>CONDITION 2 |
| A 3 | VALUE 31<br>VALUE 32 | CONDITION 31<br>CONDITION 32 |
| . | . | . |

| TITLE | VALUE | CONDITIONAL EXPRESSION |
|---|---|---|
| A 2 | VALUE 21<br>VALUE 22 | CONDITION 21<br>CONDITION 22 |
| . | . | . |

DATA STRUCTURES (DECLARATION)

```
01 K
   03 A 1           THEREFORE, A 1 AND
   03 A 3           A 3 ARE INCLUDED
    . . .           IN AN IDENTICAL
                    STRUCTURE
01 L
   03 A 2
    . . .
```

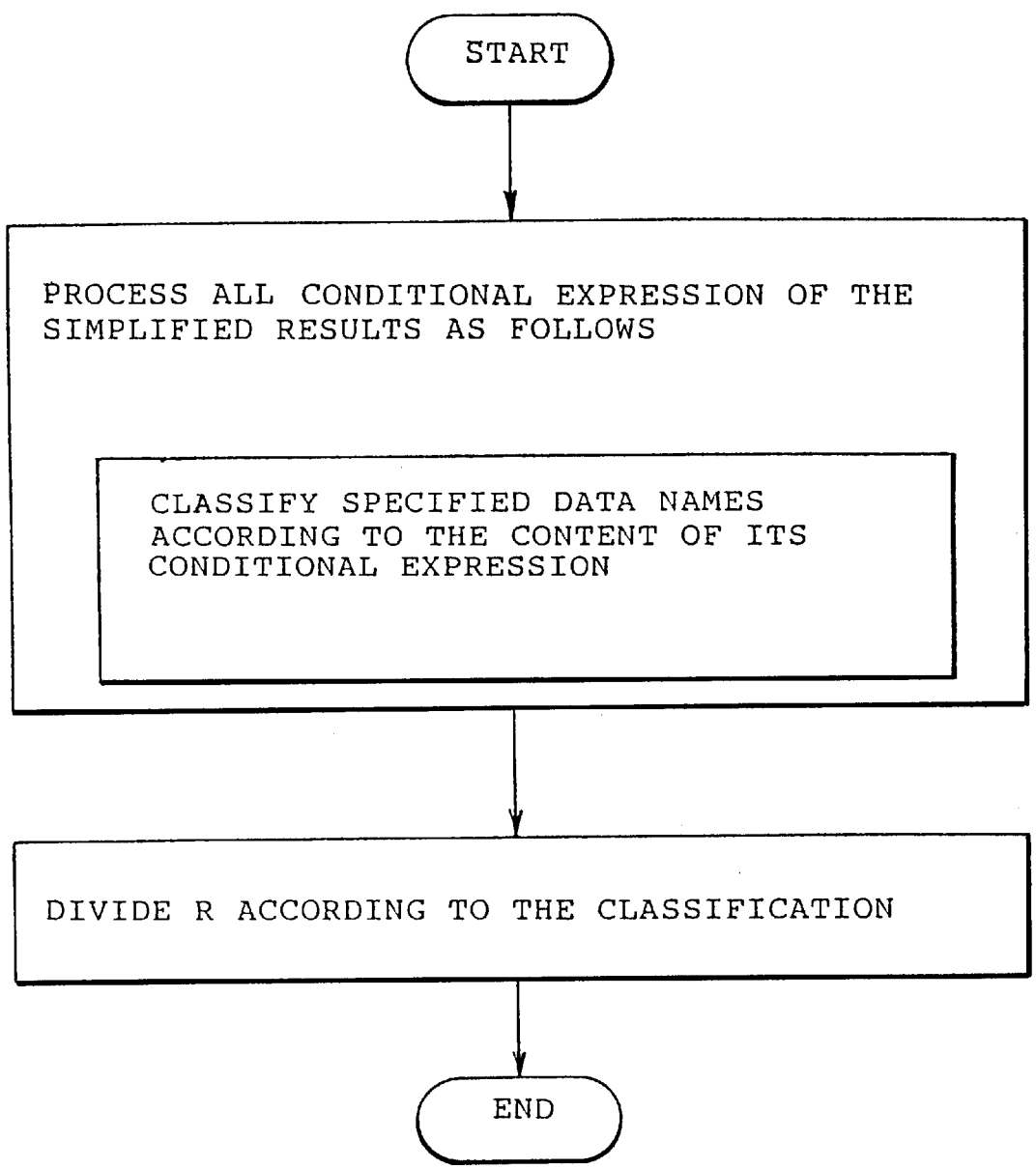

ORIGINAL PROGRAM

```
MAIN.
    .
    .
ENTRY SUB1.
    .
    .
ENTRY SUB2.
    .
    .
```

PROGRAM AFTER MODIFICATION

```
EVALUATE SWITCH
    WHEN MAIN GOTO MAIN
    WHEN 'SUB1' GOTO SUB1START
    WHEN 'SUB2' GOTO SUB2START
END EVALUATE.

MAIN.
    .
    .
SUB1START.
ENTRY SUB1.
    .
    .
SUB2START.
ENTRY SUB2.
    .
    .
```

FIG. 32
CONTROL FLOW AFTER MODIFICATION
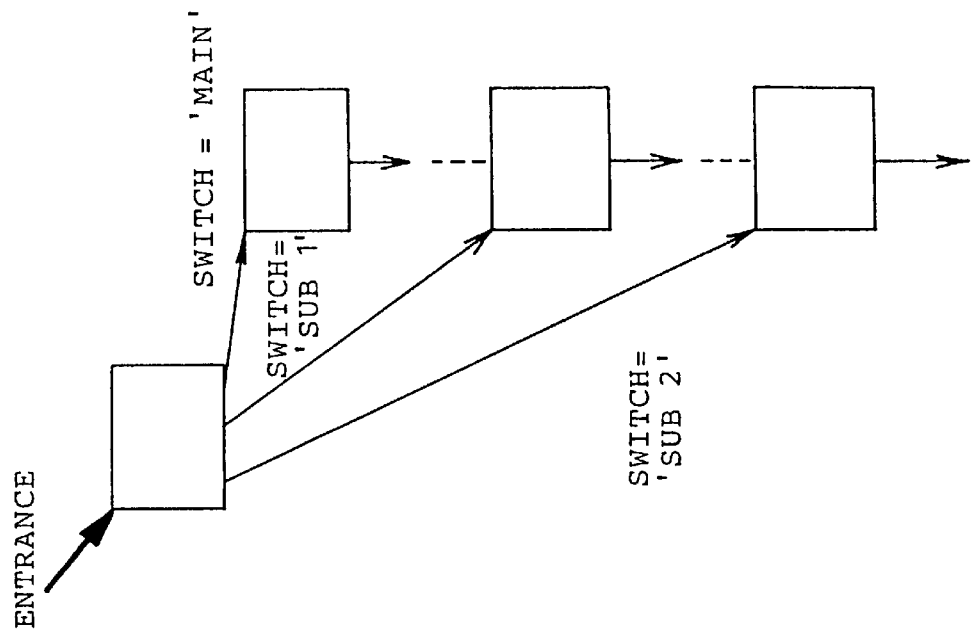
ORIGINAL CONTROL FLOW
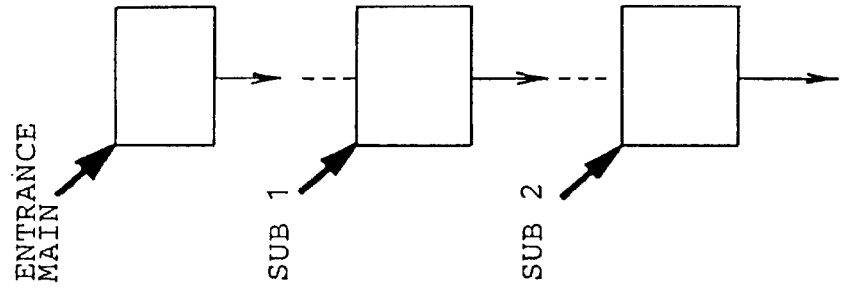

FIG. 36

FIGURE INDICATING EXECUTION TRACE OF
PROCESS IN FIG. 34

START

CURRENT BLOCK: 18
(1) (2) (7)
CURRENT BLOCK: 17
(8) (10) (2) (7)
CURRENT BLOCK: 16
(8) (9) {STORE CONDITION EQUATION B>0 IN COND EXP STACK}
(2) (3) (4)
CURRENT BLOCK: 11
(5) (3) (4)
CURRENT BLOCK: 3
(5) (6) {STORE CONDITION EQUATION NOT (I<10) IN COND EXP STACK}
(3) (4)
CURRENT BLOCK: 2
(5) (3) (7)
CURRENT BLOCK: 1
(8) (10) (2) (7) (8) (11) OUTPUT NOT (1<10) AND (B>0)
FROM COND EXP STACK

END

METHOD OF PERFORMING A REVERSE ANALYSIS OF A PROGRAM AND ITS APPARATUS

BACKGROUND OF THE INVENTION

1. Field of the Invention

The present invention relates to a data processing apparatus, and more particularly to an apparatus for analyzing an execution of a program to extract a specification of the program.

2. Description of the Related Art

For a purpose of aiding maintenance and reconstruction of the program, software tools which extract various computed information based on control flow or a dataflow, namely, a reverse engineering tools or a reengineering tools, have been developed.

However, analysis technology in a conventional reverse engineering tool or reengineering tool remains to such a level where a flowchart or control flow of the programs, or a specific data referred to or defined in the program play main roles. For example, conventional reverse engineering tools cannot obtain information about business-rules out of programs.

Namely, the conventional reverse engineering tool cannot obtain information relating to the value to be finally set for the data or to a condition/constraint for an execution of a specific process on program statement. When business-rules are attempted to be extracted by using the traditional symbolic execution technology, there is a problem that it takes time to extract the information to perform an analysis necessary for respective different data.

SUMMARY OF THE INVENTION

An object of the present invention is to obtain values to be finally set for all of the data with conditional expressions in accordance with a subject software, and to obtain a specification relating to a condition/constraint necessary for an execution of the specific program statements by analyzing a control flow or data flow of the program.

The program specification obtained by the present invention is stored as design information in a repository of CASE (computer aided software engineering) and can be reused for a reconstruction of the system or a development of a similar system. A feature of the present invention resides in a method of forming a reverse analysis of a program, analyzing contents of a program to be executed and extracting a specification of a program, which comprises the steps of:

preparing the first control flow by connecting blocks to express execution path, where each block comprises a series of statement which are executed in an order without any branch;

preparing the second control flow by finding a portion of a loop with multiple entry and exit points in said prepared first control flow, cutting the corresponding blocks, and connecting the cut blocks with the rest by inserting a new symbol designating the loop;

finding branching points and merging points of the second control flow which are not included in said loop, and expressing said branching or merging points in a hierarchical manner in accordance with a structure of said portions not included in the loop by using a new symbol of said merging point;

preparing the third control flow by finding that portion of said control flow which is other than said loop portion and said branching or merging portions and can be executed sequentially and expressing said portion to be sequentially executed by using a symbol designating a sequential execution in a hierarchical manner with the hierarchical expression of said loop and the hierarchical expression of said branching or merging portions; and extracting a specification of a program by using said third control flow.

BRIEF DESCRIPTION OF THE DRAWINGS

FIG. 4 shows the information retained in accordance with the selective elements of the control flows:

FIG. 9 shows a explanatory view of an execution trace of a generation process in the control flow 2B FIG. 10 shows a generation order of the assignment table for a basic block:

FIG. 12 shows an example of a statement of the program in which an order of the generation of the assignment table is explained:

FIG. 13 shows an example in which the assignment element is registered in the assignment table.

FIG. 14 shows a state in which two assignment elements are registered in the assignment table:

FIG. 18 shows a view for explaining an example of the process of using the order shown in FIG. 16:

FIG. 19 shows an example of a parent-child relationship in the structure of the data:

FIG. 28 shows an explanatory view of an example of a process shown in FIG. 27:

FIG. 29 shows an explanatory view of an order of processes of dividing a specification of a program in accordance with its contents and outputting the divided specification:

FIG. 32 shows an explanatory of a change of a control flow corresponding to a FIG. 31:

FIG. 36 shows an execution trace of a process shown in FIG. 34:

DETAILED DESCRIPTION OF EMBODIMENTS

Figure 1:
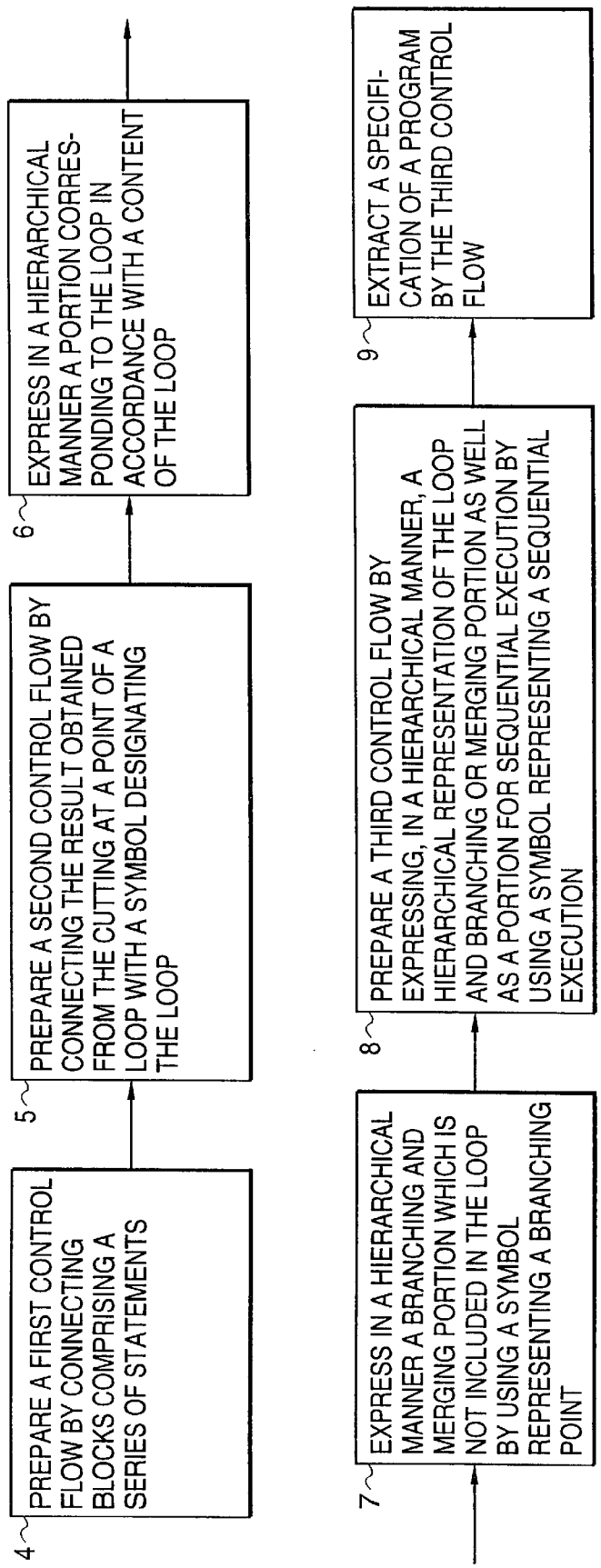
FIG. 1 shows a function block diagram.

FIG. 1 shows a functional block diagram of a program reverse analysis apparatus for extracting a specification of a program by analyzing an execution of the program.

According to the present invention, a first control flow 1 is prepared. At 4 in FIG. 1, blocks each comprising a series of statements which are executed in a predetermined order and do not include a branch inside, are connected in the order of execution to provide the first control flow 1. The first control flow 1 is prepared based on a syntax tree obtained by a syntactic analysis of the program.

The block 5 prepares the second control flow 2A. The block 5 finds a loop in the first control flow 1 prepared by the block 4 and disconnects a certain portion of the loop and blocks representing contents of a process to be executed within the loop and connected in the determined pseudo order, and the connected blocks are attributed to a symbol designating a loop, thereby preparing the second control flow 2A.

The third control flow 2B is prepared. The third control flow 2B is prepared based on the three steps shown in FIG. 1.

As a first step, a block 6 performs a process of expressing a portion corresponding to a loop in the second control flow 2A in accordance with contents of the loop in a hierarchical manner.

Sequentially, at the second step, a block 7 finds a branching point and a merging point which are not included in a loop in the second control flow 2A and hierarchically expresses portions of the branching and merging points in accordance with their structure using a symbol designating the branch.

As the third step, a block 8 identifies portion to be sequentially executed which are not part of the portions of a loop, branch or merging points and then that sequential portion, the hierarchical representation of the loop and the hierarchical representation of branch/merge are represented hierarchically with a symbol designating a sequential execution, thereby preparing the third control flow 2B.

Finally, the block 9 performs an extraction of a specification of the program by using the third control flow 2B.

The specification of the program to be extracted according to the present invention represents the final value to be set for all the data in the program and the present invention prepares an assignment table for obtaining the final value with the conditional expression.

The assignment table is first created for one block. The assignment table is created by extracting assignment operations in the block, replacing the reference to a variable with the value assigned to the variable in the preceding statement within the same block (if any), thereby creating the assignment table for the assignment operation to be performed in a block.

Sequentially, the assignment table for blocks to be sequentially executed is prepared by sequentially executing the substitution operations to be performed within the block with regard to statements in blocks which are connected in the order of the execution. The assignment table is prepared for each of more than two blocks which are provided at immediately below a block designating a branch in a hierarchical expression of the branch and merging in the third control flow 2B, comprises a series of statement and does not include the branch. Those assignment tables are prepared in accordance with a branch condition for branching upper block to lower sequence of blocks, thereby creating the assignment table for the symbol designating a branch as a assignment table with conditional expression expressing each branch condition.

In accordance with a structure of the third control flow 2B, assignment table creation procedures for one block, for an order of blocks connected in the order of execution and for the symbol designating a branch are applied repeatedly, thereby creating the assignment table with conditional expression for the whole program which is represented by the third control flow 2B.

Further according to the present invention, a condition under which some specified statement is executed can be extracted, in order to extract the specification about a conditions/constraints for the execution of a particular process.

As described above, according to the present invention, it becomes possible to extract the specification of the program by using the control flow 2B, for example.

Figure 2:
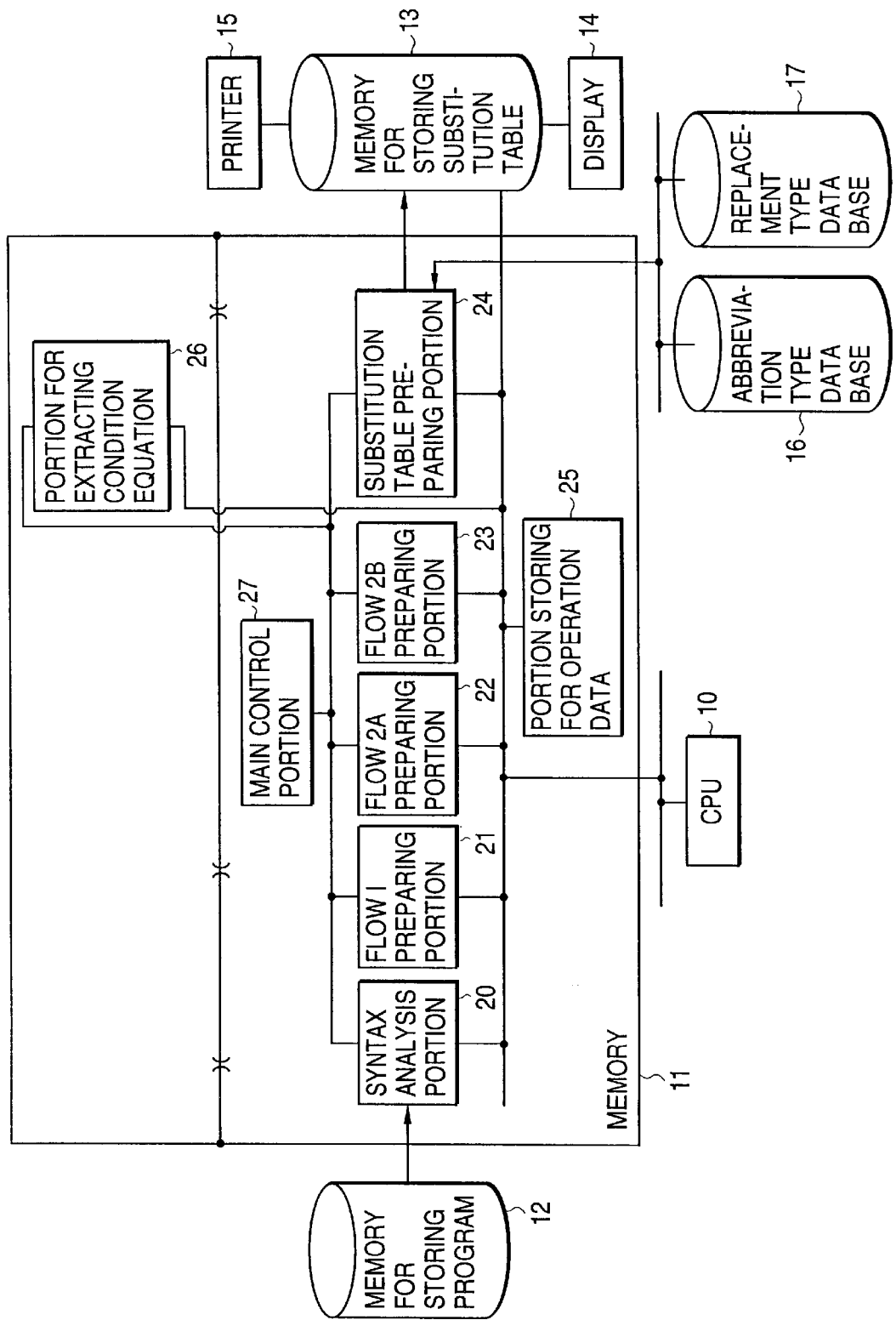
FIG. 2 shows a block diagram designating an entire computer system for executing a reverse analysis of the program according to the present invention.

FIG. 2 shows a block diagram of a complete structure of a computer system in which a reverse analysis of the program is performed. In FIG. 2A present system comprises a central processing unit (CPU) 10, memory 11, program storing memory 12 for storing a program which is the target of the analysis, the assignment table storing memory 13 for storing the assignment table comprising the table of the final values which are assigned for variables, for example, display 14 for displaying the assignment table, for example, and printer 15.

The program stored in memory 11 comprises syntactic analysis portion 20 performing a syntactic analysis of a program output from program storing memory 12, a flow 1 preparing portion 21 for preparing a control flow 1 prepared by using a prior art technology, a flow 2A preparing portion 22 for preparing a control flow 2A to be used as a starting step for preparing a control flow 2B which performs an important role of the present invention, a flow 2B preparing portion 23 for preparing the control flow 2B to be prepared from the flow 2A, an assignment table preparing portion 24 for preparing an assignment table, a job data storing portion 25 for storing job data to be used for preparation of the assignment table, for example, and a main control portion 26 for controlling the various portions described above. The control flow 1 comprises the first control flow, control flow 2A the second control flow and the control flow 2B the third control flow.

Figure 3:
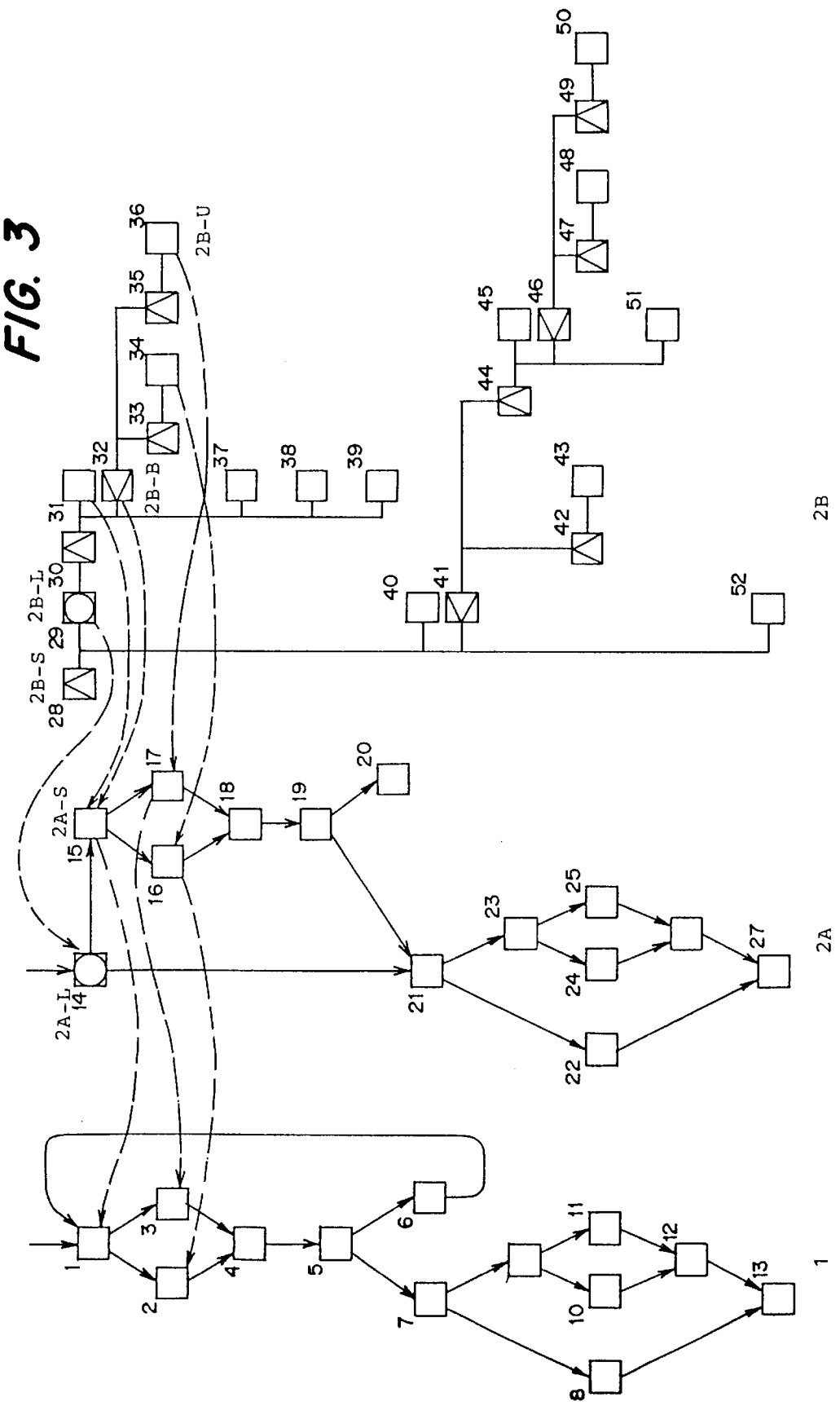
FIG. 3 shows a drawing representing a reciprocal relationship between the control flows.

FIG. 3 represents three kinds of control flows and a relationship among them used for the present invention. The control flow 1 is, as used in compiler etc., generated from the information of a syntax tree and based on the conventional technology. The control flow 1 is made up by connecting blocks each of which comprises a series of statements not including a branch along the execution paths of program. Each block has a link to the syntax tree so that information for the statements within the block is accessible. The corresponding blocks between the flow 1 and flow 2A, and between flow 2A and 2B are connected by dotted lines, although only a part of such correspondence is shown in the drawing.

The flow 2A comprises a control flow used in the present invention and is prepared based on the information of the flow 1. There are two kinds of element of the flow, 2A-S and 2A-L. The element 2A-S corresponds to respective blocks in the control flow 1 and is called a "basic block". Block 2A-L designates a loop structure existing in the flow 1.

Each element in flow 2A holds information about the order of execution. In FIG. 4 the block element 2A-S holds a reference to the set of blocks executed before/after the block in terms of actual ordering of execution, and a reference to other block executed before/after the block in terms of partial-ordering of execution. Element 2A-S also holds the contents of the process executed in the block or just a reference to the corresponding element in the flow 1. Here, the term "partial-order" means that the ordering between any two elements are not always strictly defined. For example, there's no strict ordering defined for element 16 and 17, thus it is not defined that which should be executed immediately after the element 15 or which should be executed immediately before the element 18.

In mathematical term, "partial-order" is used in contrast with a total-order in which the ordering in a system is uniquely determined, meaning even a part of ordering cannot be uniquely determined. However, a terminology "partial-order", is not so strictly used in this invention. For example, the ordering among the execution corresponding to ranch paths is called "partial-order". The number attached to respective elements in flow 2A shows a example of such partial-ordering, that is elements are ordered 15, 16, 17, 18 in terms of the partial-order.

As the information corresponding to element 2A-L, the element to be executed before/after this element, the following element to be executed in accordance with the partial-order, an entrance and exit block to or from a loop and a link to elements representing the contents of the loops.

The order of the execution of blocks A and B in the control flow determined as the partial-order of the flow 2A is comprised of four kinds of orders, comprising an order (1) in which B is executed after A, an order (2) in which A is executed after B, an order (3) in which A and B are located in a loop and either of A or B can be executed first, and an order (4) in which A and B are located on a parallel paths, and thus the order of A and B can not be determined.

Because the ordering for the blocks within a loop cannot be defined, pseudo order is defined by cutting the loop path at some point, so that it can be viewed as a straight path. The result of the cutting operation is connected to element 2A-L designating a loop in order to represent that it is actually a loop in the flow 1. The loop 1–6 in the original flow 1 can be expressed by elements 15–20 in the flow 2A obtained by cutting a portion of the loop 1–6 in the flow 1. All are connected to element 14.

An control flow 2B is generated based on the information of flow 2 to make the structure of parallel execution paths clearer. Control flow 2B has an element 2B-S for representing the execution of elements connected in series, an element 2B-B representing an execution of one of the branched paths to be selected, an element 2B-U existing at one end of tree structure and corresponding to a basic block 2A-S in the flow 2A and an element 2B-L having a single child and corresponding to the element 2A-L of the flow 2A.

The information stored corresponding to these four kinds of elements is shown in FIG. 4. An element 2B-S stores child elements, an element 2B-B stores information of a branching point corresponding to a child element, and memory, which are linked to an element shown in the flow 2A, an element 2B-U stores contents of process or a link to a corresponding element in flow 2A, and an element 2B-L, a corresponding element 2A-L stores and a link to an element 2B-S representing contents of the loop. In order to avoid an overlap in storing of information, an element 2B-L holds a link to an element 2A-L in order to avoid duplicating information, it may hold a copy of the necessary information instead.

It might seem easy to prepare the control flow when you see the control flows 1, 2A and 2B shown in FIG. 3. However this is because the program shown in FIG. 3 is relatively simple. In case the program is complex enough to be written on many sheets of flowcharts, it is usually very difficult to place respective steps of the program in accordance with the order of the execution or to qualify a structure of a loop.

According to the present invention, a flow 2A is prepared by recognizing a loop in the flow 1 prepared according to the prior art, cutting a loop at some point to eliminate return paths from the end of the loop to the beginning of the loop, then connecting blocks in a pseudo order and connecting those blocks to a symbol representing a loop. Thereby, the portion of the loop included in the flow 1 can be clearly recognized in the flow 2A.

Flow 2B expresses the control flow in a hierarchical manner by recognizing a branching or merging portions inside and outside of the loop and a portion of a sequential execution. This enables loop or branching or merging portions to be clearly expressed, although such loop and merging or branching portions have to be traced in the program in a complex manner, thereby facilitating an extraction of a specification of the program.

In the control flow 2B, a condition of an execution of the statement within the block 36 can be obtained by tracing the tree structure upward starting at a block 36. For example, it is clear that the process within a block 34 is independent of that of block 36 and, and that thus either 34 or 36 will be executed, not both, and branch condition for each block is described in the block 31.

Figure 5:
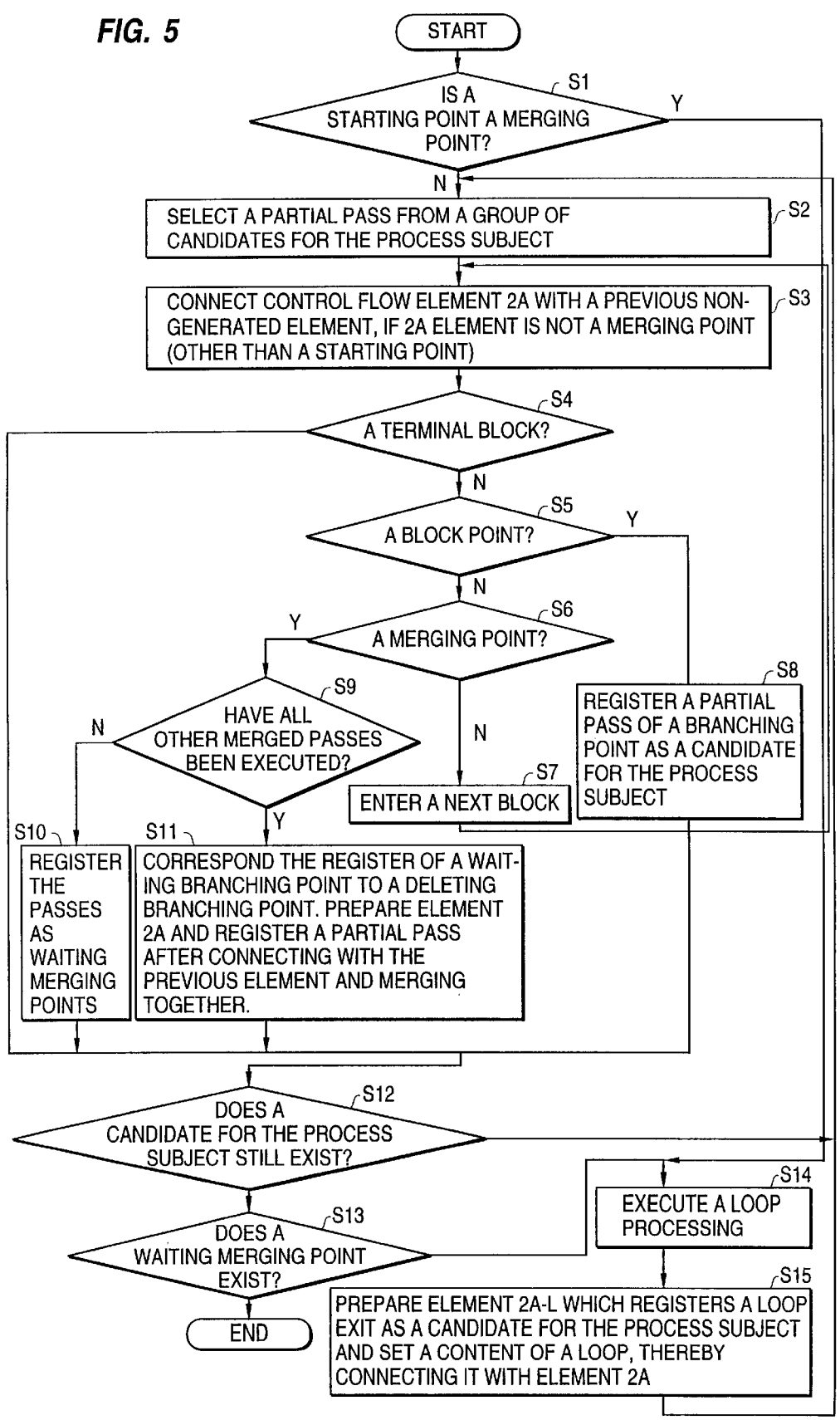
FIG. 5 shows an entire flowchart of the process for generating a control flow 2A from the control flow 1.
Figure 6:
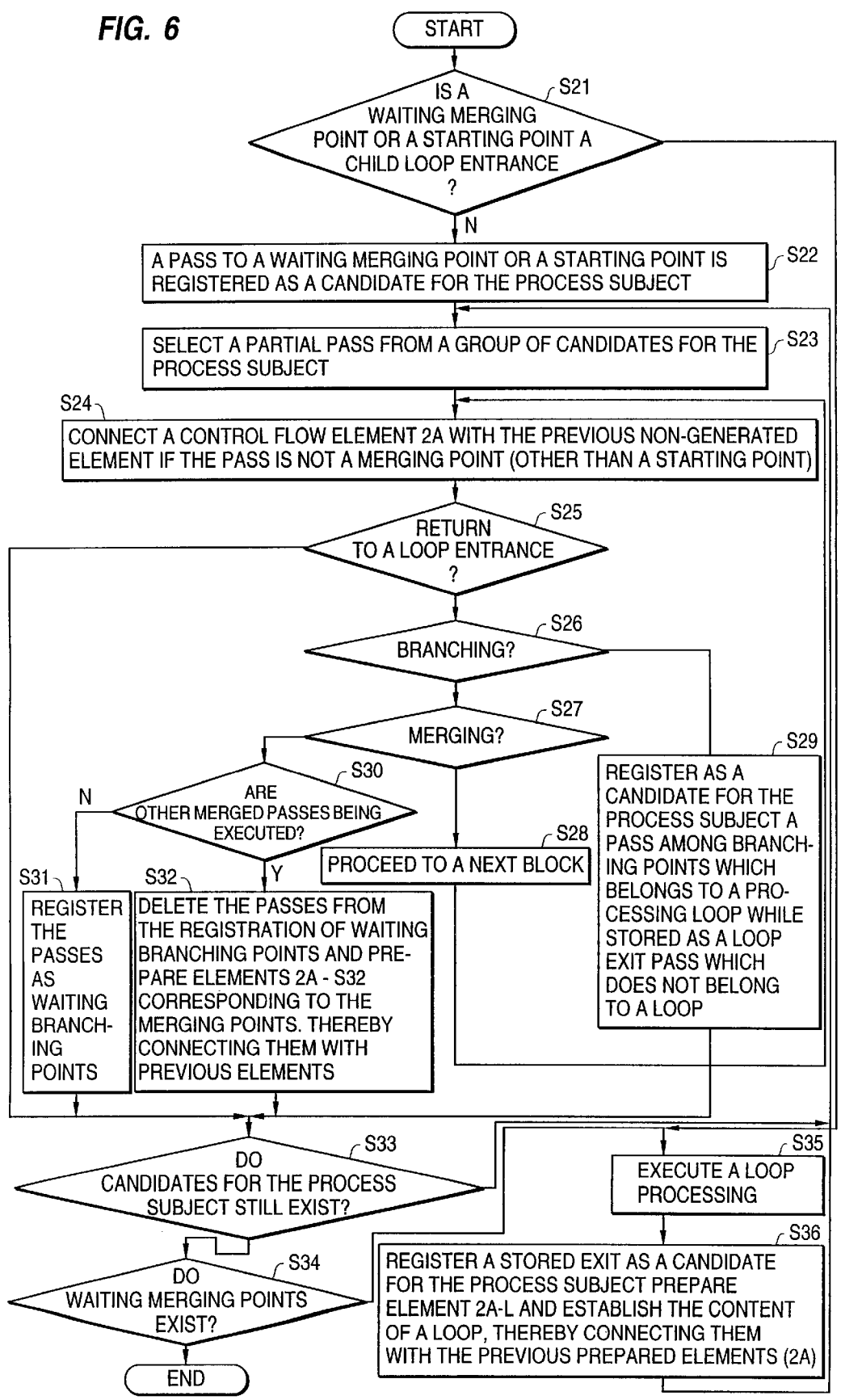
FIG. 6 shows a detailed flowchart of a loop process shown in FIG. 5.

The process of preparing the flow 2A from flow 1 and the flow 2B from flow 2A will be explained in detail by referring to the flowcharts shown in FIGS. 5 to 7. FIG. 5 shows all flowcharts for creating a flow 2A from the flow 1, FIG. 6 represent a detailed flowchart of the loop process in step S14 in FIG. 5. By referring to FIGS. 5 and 6, the process of preparing the flow 2A shown in FIG. 3 is explained.

Referring to block 1, namely, a starting point in the flow 1, the starting point is judged to be a merging point at step S1 in FIG. 5 and a process is moved to step S14 to perform a process shown in FIG. 6.

In FIG. 6, the starting point is determined as not being an entry point of the nested loop. A (partial) path to the starting point (an arrow which flows into block 1 downward in this example flow 1) is registered as a candidate for processing in step S22. And then the partial path is selected from a set candidates of processing at step S23 and the block 15 is generated as an element of the control flow 2A at step S24. Block 15 would be linked to other element if there have been any element generated before block 15. Because there is no such element in this case, no link is made. The connection will be performed upon a generation of 2A-L element 14.

It is determined that processing is not reached back to the entry of the loop at step S25, then current block, i.e. a block 1 in the flow 1, is determined to be a branch at step S26. Consequently branching paths from block 1 (path from block 1 to 2, path from block 1 to 3) are registered as candidates for processing at step S29. These paths stay inside the loop path under processing, no path is registered as an exit path from the loop.

At step S33, a candidate of a process target still remains and the process then returns to the step S23 where a new partial path is selected. Now suppose the path from block 1 to 2 is selected in accordance with the partial-order attached to each elements in the flow 1. At a step S24, the element 16 of flow 2A is generated and is connected to element 15.

With regard to block 2, as the steps S25, S26 and S27 are determined as being NO and at step S28, it advances to the next block, namely, block 4 connected to the block 2. Then the process is returned to the step S24 so that the block 4 represents a merging point, thereby creating no connection with a generated element.

With regard to block 4, the steps S25 and S26 are determined as NO and the step S27 determines the block 4 as a merging point, and at step S30 it is judged whether all the merging paths to block 4 have been processed. As the path from block 3 to 4 have not processed yet, the block 4 is registered as a waiting merging point at step S31.

At step S33, it is determined that a candidate of a process target still remains, at step S23 a partial path from blocks 1 to 3 is selected, and at step S24 element 17 is generated to be connected to the previous element 15. Regarding block 3, the steps S25 to S27 are, all determined as NO, and at step S28 the process advances to block 4, at step S24 no processing carried out and simply advances to the step S25.

Regarding block 4, the steps S25 and S26 are determined as NO, at step S27, the block 4 is determined as a merging point, at step S30, all the merged paths have been determined as being processed, at step S32 a registration of the block 4 as the waiting merging point is deleted, to generate a block 18 and to connect it to blocks 16 and 17. Then a partial path after a merging operation, namely, a path from blocks 4 to 5, is registered as a candidate of a process subject.

Step S33 determines that a candidate for a process target still remains and the process is returned to step 23 to select the partial paths 4 to 5. The step S24 generates element 19 and connects it to element 18. Regarding the block 5 corresponding to the element 19 thus created, the step S25 is determined as being as NO and the step S26 is determined as a branch, and at step S29 the path to the block 6 is registered as a candidate for a process target, thereby storing a path from blocks 5 to 7 which does not belong to the loop, as an exit path from the loop.

Step S33 determines that a candidate for a process target still remains, step S23 selects a path from block 5 to 6 and step S24 generates an element 20 to connect it to an element 19. Regarding block 6 corresponding to element 20, the steps S25 to S27 are determined as NO, and at step S28 the process advances to the next block, namely, block 1. An element 15 to be generated at step S24 has already been generated and an element 20 is not connected to element 15 to cut the loop as described above. The step S25 determines that the process is returned to the entrance of the loop and the step S33 determines that a candidate for the process target does not exist, and step S34 determines that the waiting merging point does not exist, thereby terminating the loop process.

When the loop process shown in FIG. 6 is terminated, the process is returned to the step S15 shown in FIG. 5 and an exit from the loop, namely, a partial path from the block 5 to block 7, is registered as a candidate for the process target, thereby generating 2A-L element 14 in control flow 2A, The element 14 is connected to the element 15 in the flow 2A, while an arrow is illustrated in a downward direction to show a connection of the element 14 with a previous element 2A. Then the process is returned to step S2.

Step S2 selects a partial path from blocks 5 to 7 and step S3 generates element 21 in the flow 2A, and connects the element 21 to previous elements 19 and 14. Thereafter, the step S4 determines that the block 7 corresponding to the element 21 generated above is not a terminating block. The step S5 determines that the element 21 is a branching point and step S8 registers a partial path as the branch path, namely, the blocks 7 to 8 and the blocks 7 to 9 as candidates for processing. The step S12 determines that a candidate for a process target still remains, thereby repeating the process following the step S2.

The following process is similar to the process corresponding to the blocks 1 to 6, and thus the detailed explanation is abbreviated. It should be noted the block 13 is not determined as the terminating block at the step S4, as the other merging path exists, and the process advances to the step S5. Even if step S4 determines a block as a terminating block, the steps S12 and S13 are carried out. Because a program in general has multiple terminating blocks. For example, if a program terminates at a certain point without being merged after a branching operation occurs, such as error handlers, the steps S12 and S13 becomes necessary to check whether a process is terminated regarding all the other paths.

Figure 7:
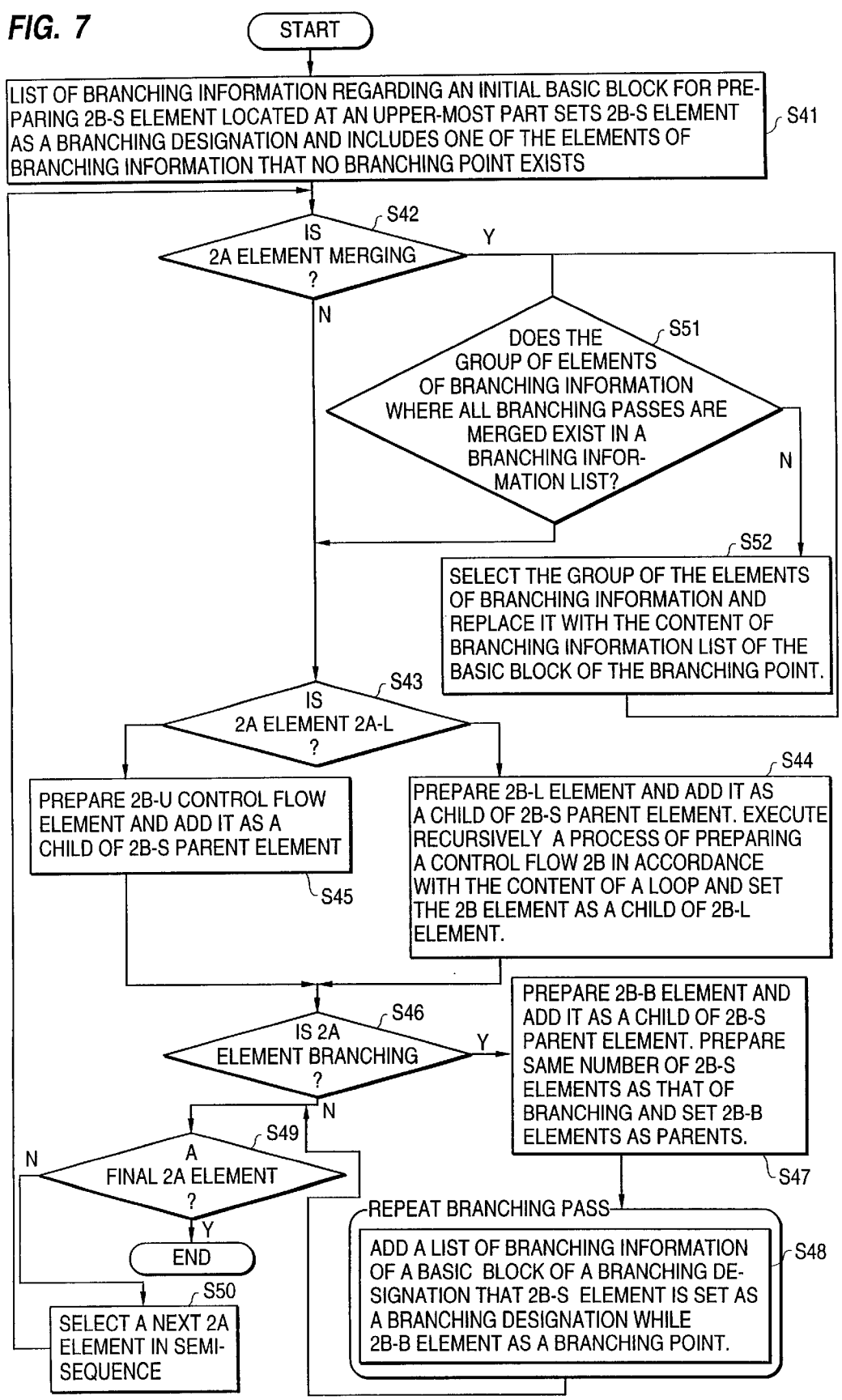
FIG. 7 shows a flowchart of a process for generating a control flow 2B from the control flow 2A.
Figure 8:
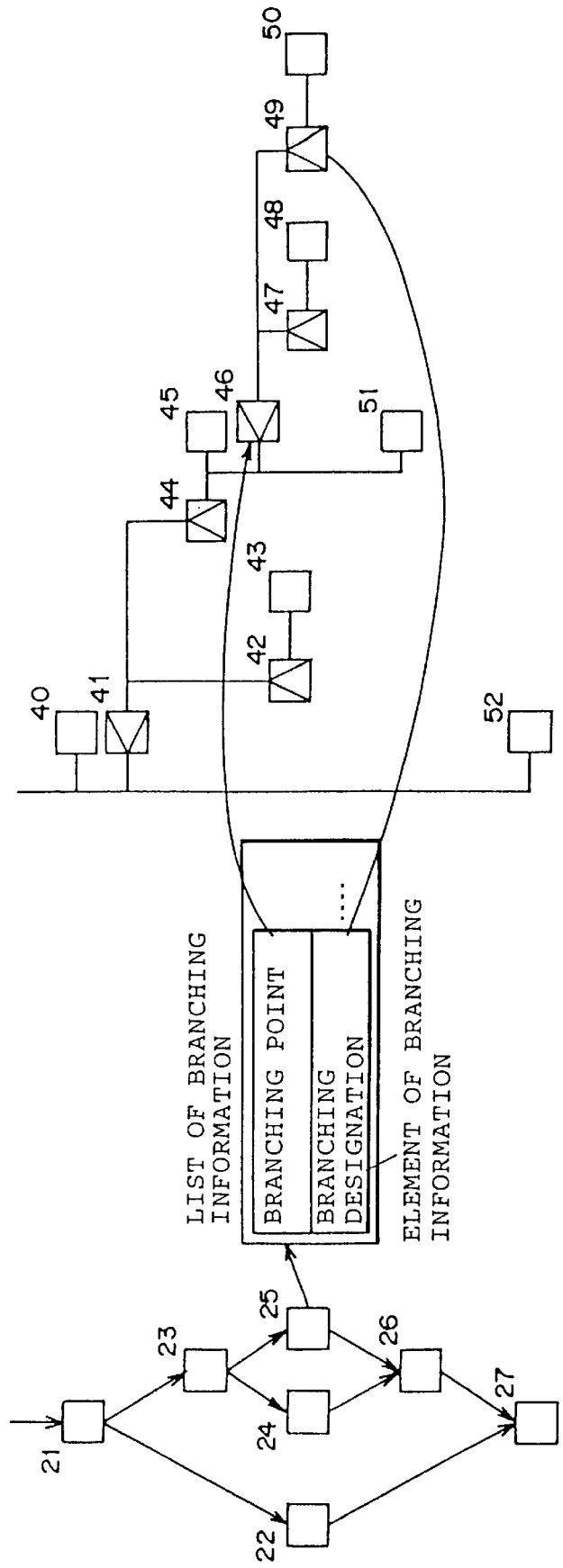
FIG. 8 shows an explanatory view of a branch information corresponding to a basic block.

FIG. 7 shows a flowchart of a process of generating the control flow 2B from the control flow 2A. The process shown in FIG. 7 will be explained in detail by referring to FIG. 8, explaining branch information added to a basic block in control flow 2A, and to FIG. 9 designating a place of an execution of a process of generating the control flow 2B.

It might be better to explain a generation of the control flow 2B for element 2A-L and elements 15 to 20 corresponding to the loop in the flow 2A, and thereafter to explain a generation of the flow 2B for elements 21 to 27. However as FIGS. 8 and 9 relate to elements 21 and 27, a process of generating elements 15 to 20 is explained in detail, a generation of the flow 2A from the control flow 1 is explained, and a generation process for elements 15 to 20 can be explained independently from a generation process for elements 15 and 21 to 27, and a generation process of the control flow for elements 21 to 27 is explained in detail.

The step S41 in FIG. 7 generates top element 28. Then, a branch information list of a basic block to be processed first, namely, element 21 in the flow 2A, describes the element 28 as the branch path and does not describe any branching point. Step S42 determines that the 2A element 21 is not a merging point. In the control flow 2A, two arrows from 2A-L element 14 and basic block 19 come toward the block 21, but path from block 19 is not considered as merging path to block 21 because it represents the exit path from the loop (element 14).

The step S43 determines that the 2A element, namely, basic block 21, is not 2A-L element and the step S45 generates 2B-U element 40 of the flow 2B which is linked to child of a parent 2B-S element 28. Thereafter the step S46 judges that the element 40 is a branching point and the steps S47 and S48 are carried out. First element 41 is generated as 2B-B element and is linked to child of element 28, and as many new 2B-S as the number of branch paths, that is two 2B-S element 42 and 44 in this case, are generated and linked to parent 2B-B element 41. The branch information of a branch information list corresponding to element 21 has such contents as explained in the step 41. The branch information for the basic block 22 has branching point of 2B-B element 41 and branch path of 2B-S element 42, and for the basic block 23 has 41 and 44 respectively.

The step S49 determines whether a process is performed for the last 2A element and the step S50 selects the next 2A element in terms of partial-order, block 22. The step S42 determines that the block 22 is not a merging point and the step S43 judges that the block 22 is not the 2A-L element. At the step S45 2B-U element 43 is generated corresponding to the basic block 22 and is linked as a child of the 2B-S element 42. The step S46 determines that the basic block 22 is not a branching point and the step S50 through the step S49 selects basic block 23 as the next 2A element in the partial-order. The step S45 through the steps S42 and S43 generate 2B-U element 45 corresponding to the basic block 23 as a child of element 44.

Step S46 determines that 2A element 23 is a branching point. Similar to the above explanation, the steps S47 and S48 generate 2B-B element 46 and 2B-S elements 47 and 49 as a child of element 46. The branch information for the basic blocks 24 and 25 in the flow 2A is prepared as shown in FIG. 9. Iterating two times advancing through steps S49 to S50, steps S42 though S43 and steps S45 to S46. In the step S45 2B-U element 48 and 50 are generated as the children of 2B-S element 47 and 49, respectively.

Step S50 selects basic block 26 as the next element in terms of partial-order and step S42 determines the basic block 26 as a merging point, thereby perfordeng a judgment step S51. The step S51 determines whether a set of a branch information element corresponding to basic block 24 and 25 as merging paths exists in the branch information list. In this case, as it already exists, the step S52 replaces the set of the branch information elements by the contents of the branch information list of the basic block 23, designated by the set of branch information elements that is [41 to 44]. This replacement means that the branch information in a merged branch path is deleted, and the process is returned to the information before the branching operation was performed.

After this replacement, step S51 in the next iteration determines NO because the set of branch information elements has already been deleted, thereby advancing the process to the step S43.

The step S43 determines that the merging block 26 is not 2A-L element. The step S45 generates element 51 as 2B-U element and a child of 2B-S element 44.

The step S50 after the determination of the steps S46 and S49 selects element 27 as the next 2A element, and step S42 determines the element 21 as a merging block, thereby performing the process of steps S51 and S52. In correspondence with a path from basic block 22 and a path from basic block 26, set of branch information elements of the block 22 and the branch information of the block 26, namely, that of the block 23 are replaced by the branch information of the block 21. The step S53 judges that the block 27 is not the 2A-L element and the step S45 generates element 52 as a child of the 2B-S element, thereby terminating the process.

In the control flow 2B generating flowchart shown in FIG. 7, the process for the merging operation forms a loop starting with the step S42. This is because a branch path starting from several different branching point can merge at a single block. For example, two branching paths branched at the branching point B merge at point C, a branching path starting from a branching point A which is located before the branching point B is connected to the branching point B, and other branching path starting from the branching point A merge with the two branching paths branched at the merging point C. At the merging point C after the branching path starting from the branching point A goes through the point D, the two branching paths are merged. Then it is necessary for the merging point C to recognize that the branching path starting from the point A merges at the point C after the branching path starting from the point B merges at the point C. Therefore, the loop process is used in the merging operation in FIG. 7.

The flow 2B corresponding to the basic blocks 15 to 20 following the 2A-L element 14 as shown in the upper portion of the flow 2A, can be conducted similarly. The step S43 determines the element 14 as the 2A-L element and the step S44 generates 2B-L element 29 as a child of the element 28. The flow generating process shown in FIG. 7 can be recursively performed for the contents of the loop corresponding to the basic blocks 15 to 20 and the control flow thus obtained is determined as a child of the element 29.

At step S41 element 30 is generated as the 2B-S element at the upper most position. And at steps S42 and S43 the 2A elements are not merging points and 2A-L element respectively, at step S45, the 2B-U element 31 is generated as a child of the element 30C. As the basic block 15 is a branch, the process corresponding to the branch is performed at the steps S47 and S48 after the 2A element is determined as the branch at the step S46, and this process is similar to the above described one and its explanation is therefore abbreviated. It is not expressively shown in the flow 2B that the element 38 corresponds to an exit of the loop, but it becomes clear by referring to the information stored corresponding to the 2A-L element which corresponds to the 2B-L element 29, that the element 38 is an exit of the loop.

The process of generating the control flow 2B from the control flow 1, namely, the control flow generated from the program in accordance with the conventional technology through the control flow 2A, is explained in detail by referring to FIG. 3. The present invention aims at analyzing an execution of the program by using the generated flow 2B and extracting a specification of the program. Therefore, a process of extracting the specification from the program will be explained hereinafter.

FIG. 10 shows a process of generating an assignment obtained by using a result of obtaining a value finally assigned for the value of variables in the program, and more particularly a process of generating the assignment table for a basic block at the element shown in the control flow 2B. The process in FIG. 10, step S60 repeats the following process for assignment statements in the particular basic blocks, namely, the assignment statement designating the assignment of a value for a variable (data item). At step S61, L is obtained as the data item in the assignment statement S and R as the assignment value. When the variable does not appear in the assignment value R, the assignment element 62 for the assignment statement is generated from L and R and is registered in the assignment table U. The assignment element designates a line of data in the assignment table, namely, the data item, the assignment value for the data item and a condition for the assignment.

When a variable V appears in the assignment value R, it is determined at step S64 whether the assignment for V is already registered in the assignment table U. When the assignment is already registered in the assignment table U, the last assignment element L whose registration is completed is obtained, and the variable V is assigned by the assignment variable at step S65. When the assignment of the value R for V is not registered, no process is performed. When all the registration processes are completed for all the variables V appearing the assignment value R is completed, the generation of the assignment element A2 and registration of assignment element A2 as the assignment for table U are performed.

Figure 11:
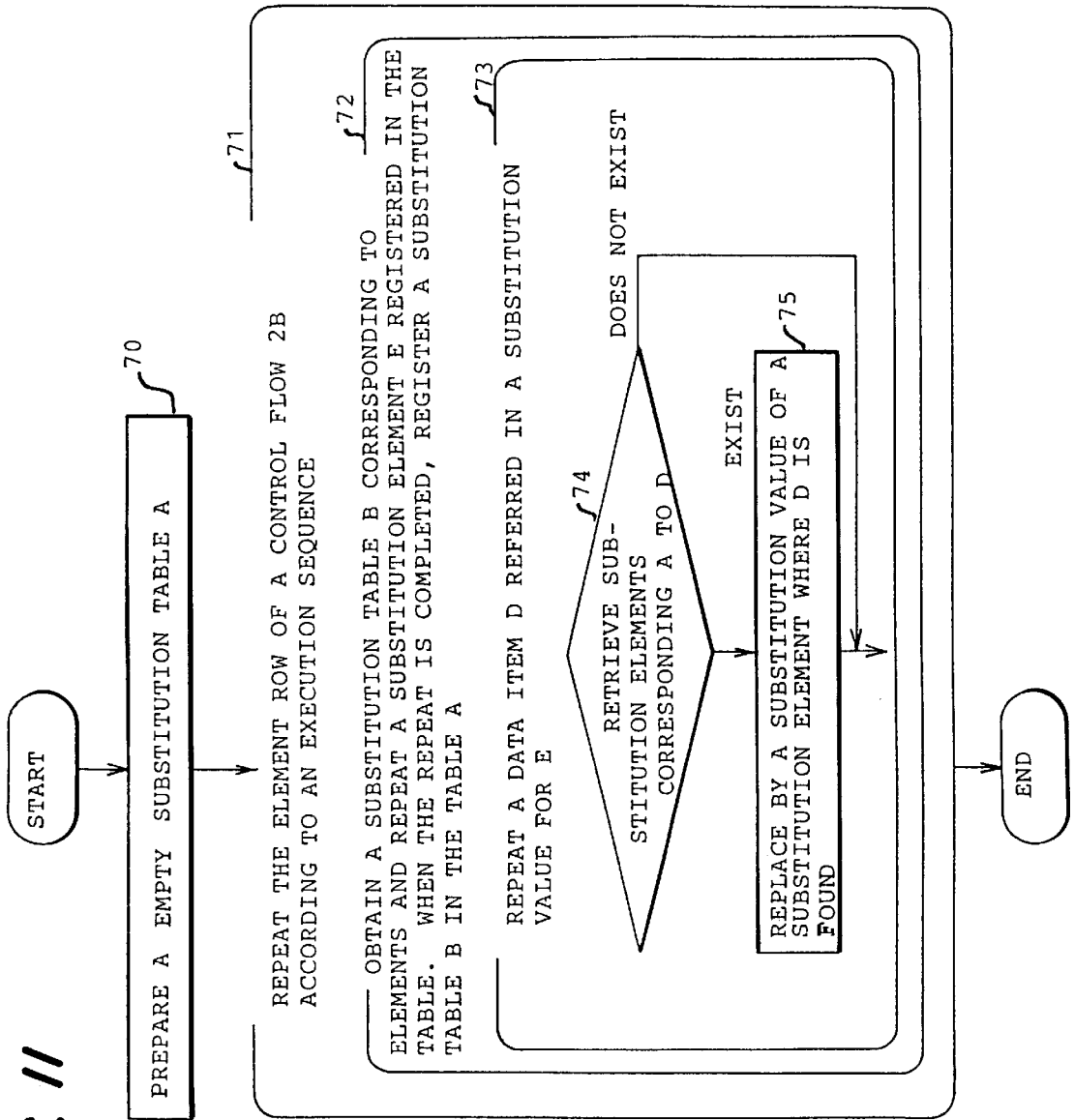
FIG. 11 shows an explanatory view of an order simplifying respective assignment table for respective basic blocks in accordance with an execution order of the program.

FIG. 11 shows a process of combining assignment tables corresponding to blocks, each of which is generated correspondingly to a block in accordance with the FIG. 10, in execution order of the program and generating a single assignment table corresponding to blocks which are processed sequentially. When the process starts in FIG. 11 at the step S70 and an empty assignment table is generated at the step S71, the process for a series of elements, namely, respective blocks, in the flow 2B is repeated in accordance with an execution of the order.

Contents of the process for respective blocks is shown at step S72, the process is repeated for assignment element E registered in the assignment table for respective blocks, namely, the assignment table B prepared in accordance with the process of the FIG. 10, and when the assignment element 13 completes the operation, the assignment table B is registered in the assignment table A.

The step S73 is repeated for the assignment element E registered in the registration table B and the steps S74 and S75 are repeated for the data item D which is referred to by the assignment value. At step S74, the assignment element is retrieved for the data item D from the assignment table A. When the assignment element is not found as a result of this retrieval, the process of data item D is completed. When the assignment element D is found, the data item D is assigned by an assignment value of the element found at step S75.

FIGS. 12 to 14 respectively show examples for use and explanation of an order of generating the assignment table. FIG. 12 shows a lower portion of the control flows 1 and 2B explained in FIG. 2, namely, the portions other than a loop, and represents an execution of the statement of a program as a process to be executed in respective blocks in the flow 1. The following statement in the basic block 7 designates that the assignment value 3 is assigned for the data item 8. The status of the assignment table in which only the assignment element corresponding to the statement is registered is shown in FIG. 13.

Move 3 to A

In the following statement, the data item is B and the assignment value is A* 2.

COMPUTE B=A* 2

As variable A is included in the assignment value and is explained in 65 in FIG. 10, the result obtained by substituting the variable A by "3" of the assignment value registered in the assignment table, is generated as the assignment element as shown in FIG. 14, thereby registering in the assignment table.

Figure 15:
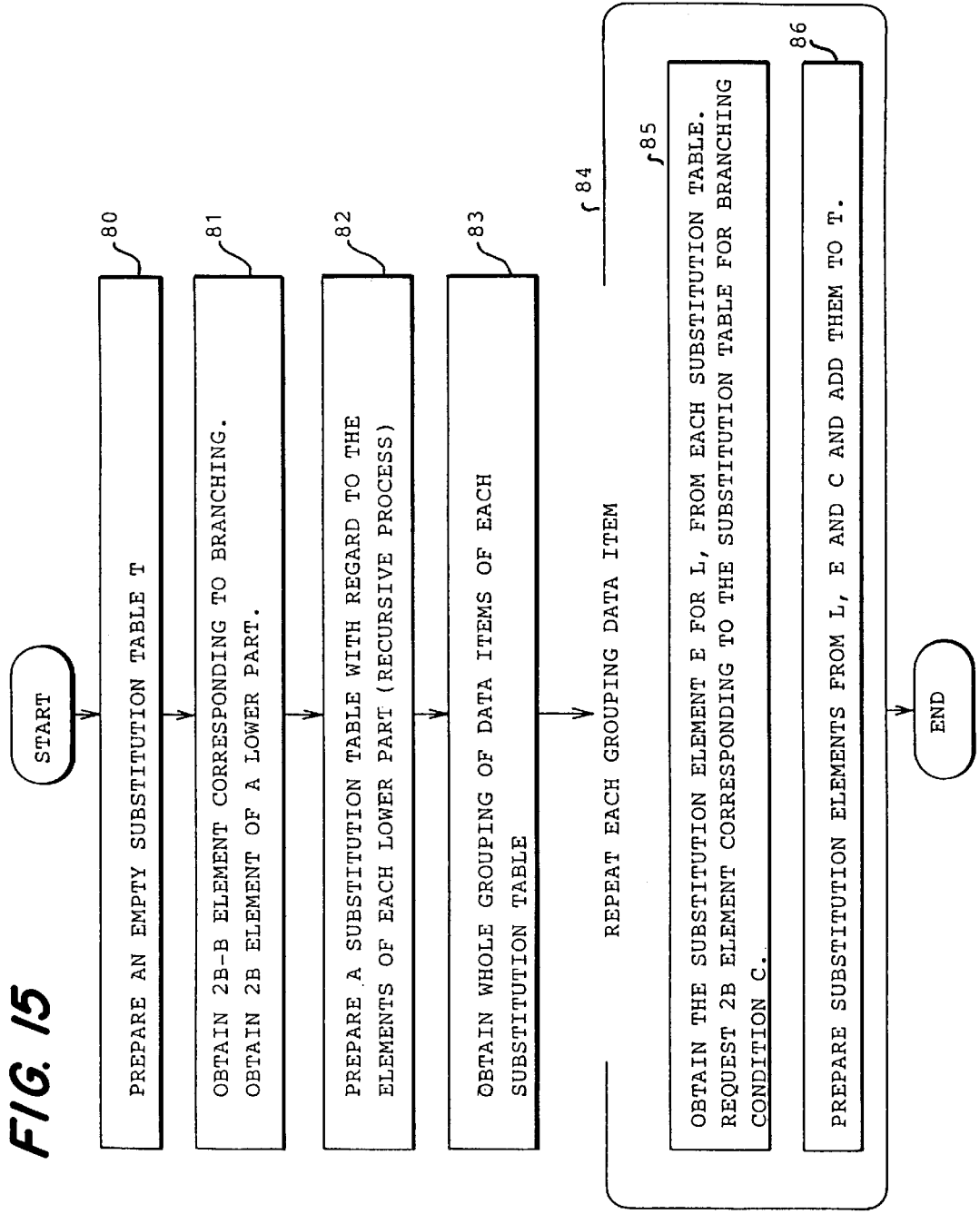
FIG. 15 shows an explanatory view of a procedure in which the assignment table for branching is generated by merging assignment tables for each branching paths.

FIG. 15 shows a process of an order for combining data item assignment tables corresponding to basic blocks which are combined by the 2B-B elements in the control flow 2B, and preparing a single assignment table. In FIG. 15, when the process starts, the empty assignment table T is generated at step S80, and the 2B element is located at a lower position than the 2B-B element corresponding to the branch, the 2B element is obtained at step S81 and a process of generating an assignment table for the basic blocks located at a lower position is recursively performed at the step S82.

When the assignment table corresponding to a lower basic block, all the sets of the data item in respective assignment tables are obtained at step S83, and the process for respective data item V in the sets is repeated at step S84.

The assignment element E assigned for item V is obtained from respective assignment table at step S85, and a condition C by which a branch operation is performed for each basic block corresponding to the respective assignment tables, and at the step S86 the assignment elements are generated by using V, E and C so that the assignment elements are added to the assignment table T.

Figure 16:
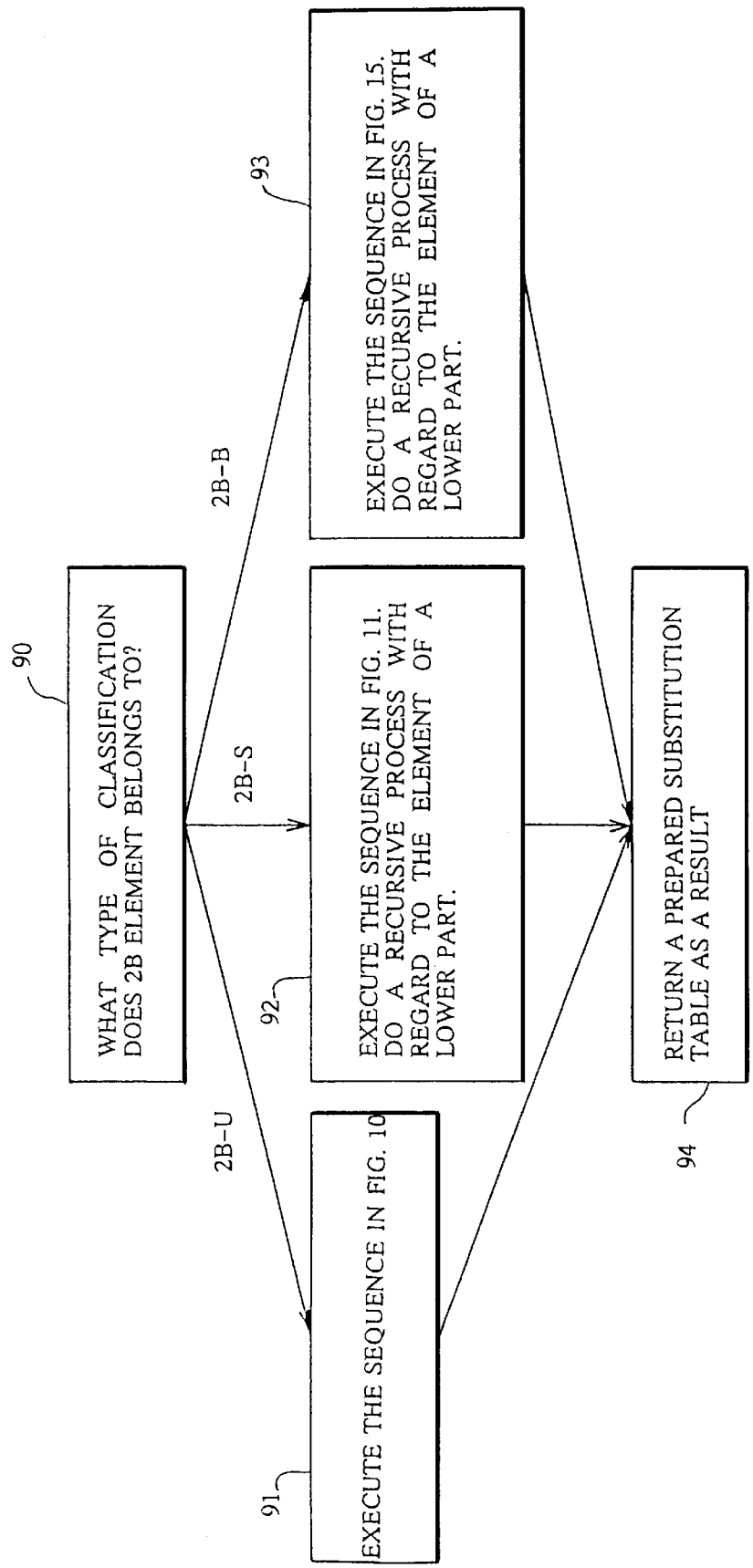
FIG. 16 shows a procedure in which all the assignment tables are merged in accordance with the control flow 2B.

FIG. 16 shows a process order for further unifying the assignment table generated through the processes shown in FIGS. 11 and 15 and for obtaining the assignment table corresponding to the entire program. In FIG. 16, respective elements are obtained one by one from an end point to a root of the control flow 2B. At step S90, the classification of the element of the control flow 2B is determined. When the element is 2B-U element, the process shown in FIG. 18 is executed and the assignment table corresponding to a basic block is returned as a result at the step S91 and S94. When the 2B element is 2B-S, the process shown in FIG. 11 is carried out at the step S92, the process is recursively carried out for a lower element, when the process for a lower element in the execution order is completed, the generated assignment is returned as a result at the step S94. When the 2B element is 2B-B, the process in FIG. 15 is carried out at the step S93. This process is recursively performed for the 2B-B element which is located at the lower position and designates the branch, and when the process for the 2B element is completed, the generated assignment table is returned as a result at the step S97. When the process for all the elements is completed at the control flow 2B, a simply defined assignment table is generated for the program.

Figure 17:
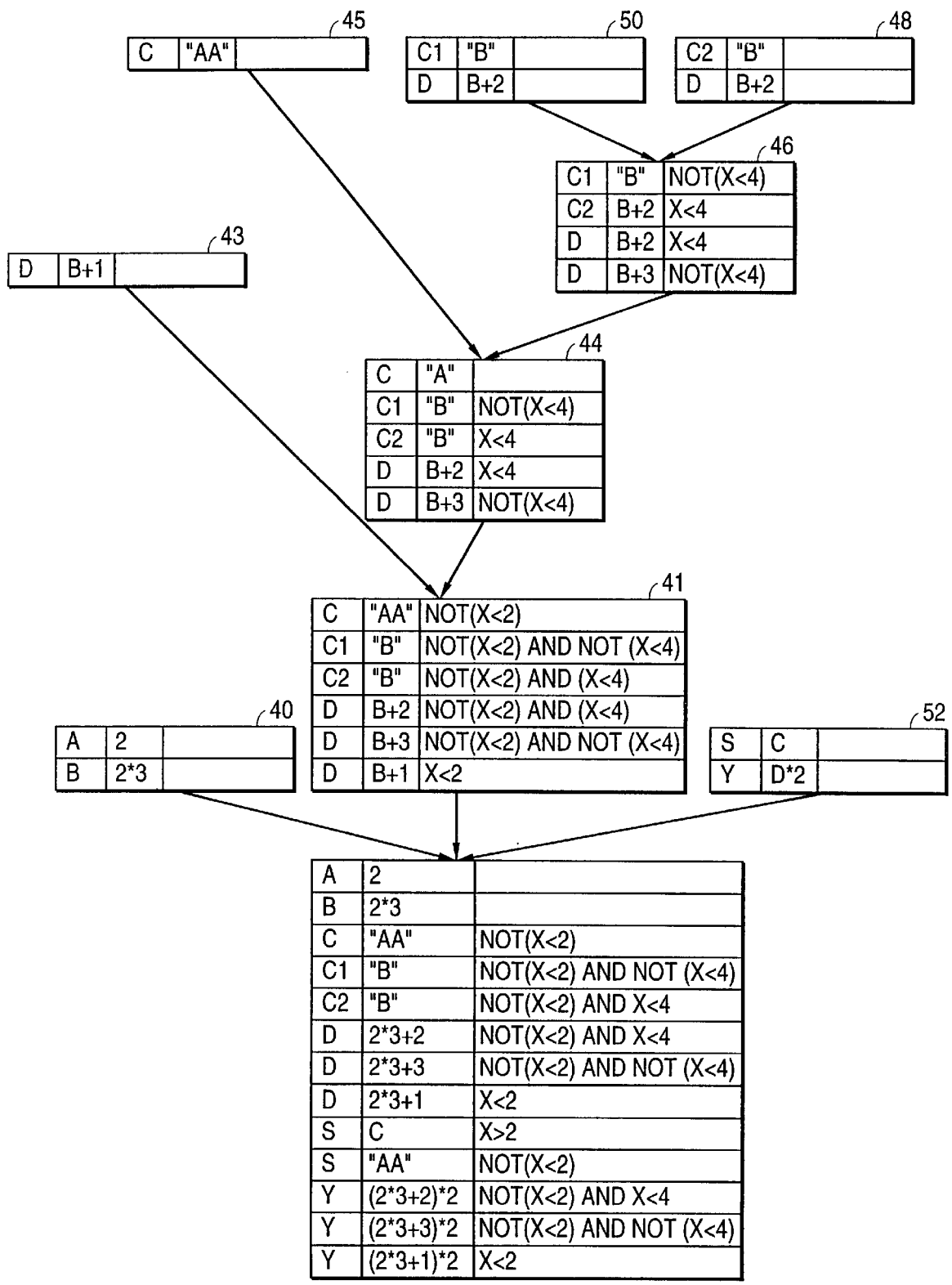
FIG. 17 shows a view for explaining an example of the process of utilizing the order shown in FIG. 16.

FIGS. 17 and 18 explain a process of applying the assignment table corresponding to a lower part of the control flow 2B shown in FIG. 2, namely, element 40 to 52, by using a process statement shown in FIG. 16. A process of generating the assignment table is explained in accordance with the statement for the flow program in respective basic blocks of the control flow 1 in FIG. 12.

In FIG. 17 the assignment table of basic blocks 48 and 50 located at a portion lower than 2B-B element 46, corresponding to basic blocks 10 and 11 in the control flow 1 is obtained as the assignment table corresponding to element 46. When X is less than 4 in accordance with a determination condition provided in basic block 9 in the control flow 1, the process of basic block 10 is carried out, and when X is not smaller than 4, the process of the basic block 11 is carried out. Such determination condition is provided for each assignment element.

The assignment table corresponding to basic blocks 45 and 51 is formed corresponding to element 46. Then the assignment tables are unified to prepare the assignment table for element 44. As an assignment statement is not included in basic block 12 in the control flow 1 which corresponds to element 51, only contents of an assignment statement corresponding to element 45 is added to the assignment table for the element 46, thereby preparing the assignment table for element 44.

The assignment table for 2B—B element 41 is prepared by combining the assignment table for element 44 and the assignment table corresponding to basic block 43, and also corresponds to a determination statement in basic block 7 corresponding to element 41, depending on an additional condition of whether X is less than 2. Finally, the assignment tables for basic blocks 40 and 52 are prepared, thereby forming the assignment table corresponding to the elements 40 to 52 in the control flow 2B. The intermediate result obtained immediately before the final assignment table is prepared as shown in FIG. 18, and the assignment table shown in FIG. 18, is obtained by combination with the assignment table for 2B—B element 41.

The above description of the process of preparing the assignment table is applied to the case where a variable is treated as the data item are basically independent from each other. And the variables form a certain structure, the process of preparing the assignment table should be conducted concerning such structure of variables. FIG. 19 shows an example of a parent-child relationship between variables which form a structure. In FIG. 19, variable C forms a structure comprising variables C1 and C2.

Figure 20:
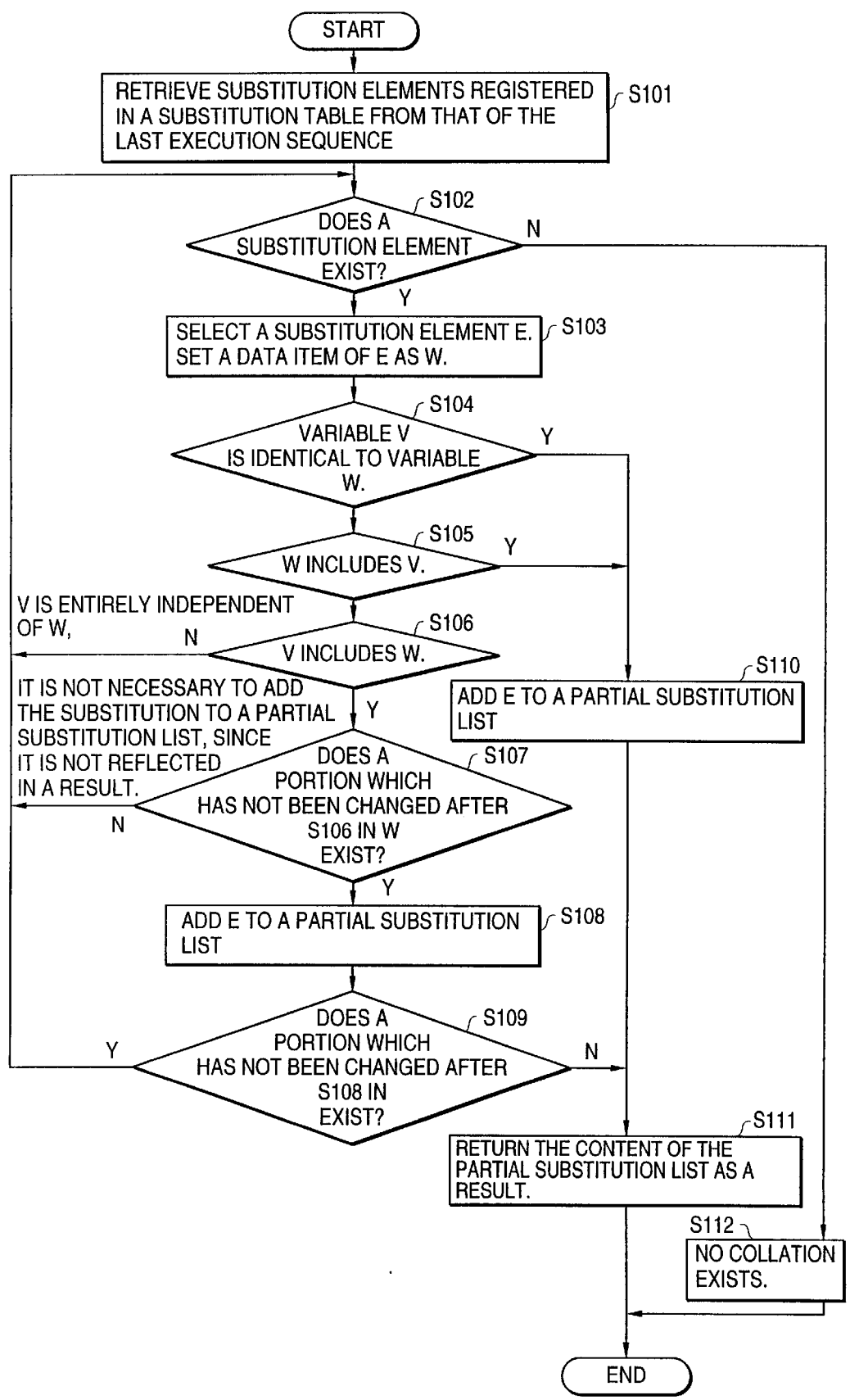
FIG. 20 shows a view for explaining an order of a search for the assignment value assigned for the variable having an inclusive relationship.

An example of the parent-child relationship is that the variable C comprises variables C1 and C2, further variable C1 comprises variables c11 and c12, and variable C2 comprises variables c21 and c22. A process of retrieving the assignment table concerning such parent-child relationship (an inclusion relationship) of the variables is shown in FIG. 20. In FIG. 20, process of retrieving the final assignment value for the variable V based on the assignment table will be explained when the variable is expressed as V.

First, a retrieval of a variable c11 is explained as a simple case. When retrieval of assignment element registered in the assignment table in step S101 is started, it begins at the last assignment element in the execution suite order at step S101, and at step S102 it is determined whether the assignment element exists or not. When the assignment element exists, the data item of the assignment element E is expressed as W and it is determined at step S104 if V and W represent the same variable, the final result of variable c11 is determined to be retrieved, therefore, adding the assignment element to the partial assignment list at step S110 and returning the contents of the partial assignment list as the result at step S111. The process is then completed.

When V and W do not represent the same variable at step S104, it is determined at step S105 whether W includes V.

Even if W is C1/C, W includes V, and even if W is C1 and the assignment element E is substantially the assignment element for c12, the variable c11 is deemed as the final result. Therefore, the assignment element E is added to the partial assignment list at step S110, and the contents of the partial assignment list is returned as a result at step S111, thereby terminating the process.

When W is determined not to include V at step S105, it is determined in step S106 whether V includes W. When it is determined at step S106 that V does not include W, and that V does not have any relationship with W, the processes returns to step S102 and the next assignment element is retrieved.

When it is determined at step S106 that V includes W, this corresponds to this case. The variable C1 is found, and the variable C is retrieved for V, which is determined at step S107. The portion of the program in which the value is not changed exists in W, namely, in the portion of the program starting at the point of the retrieved and ending at a point of the last statement. And when W is variable C1 for example, the assignment element E selected at step S103 is for variable c11 and no changes applies to variable C12. And, namely, the final result of the variable C12 is not included. In this case, the assignment element for changing variable c11 in assignment element E is added to the partial assignment list at step S108 and it is further determined at step S109 whether the portion in which its value is not changed exists in V, namely, the variable C at the step S109. When the variable c12 exists as the portion which is not changed, then the process returns to step S102 again and a retrieval of the next assignment element is continued.

The assignment element E substituting for variable c12 as W is selected, it is determined at step S107 that the assignment element E is determined as the portion in which the value is not changed at the latest stage, and is added to the partial assignment list at step S108. When it is determined at step S109 that the value of variable C2 is not yet changed, namely, the final value of C2 is not yet obtained, a process starting from the step S102 will start again.

Even if the variable C1 is selected again as W at step S103, it is determined at step S107 that the portion in which the value is not changed does not exist in C1, the assignment element is not added to the partial assignment list, and a process starting from step S102 will start again.

When the assignment element E for executing an assignment for variable C2 by changing variables c21 and c22 is selected at step S103, the result of the change of two variables is added to the partial assignment lists at step S108. Then it is determined at step S109 that the portion at which the value is not changed at the latest page does not exist in V, namely, the final value is determined for all the portions of the structure of the program and the assignment for the partial of the assignment list is returned as a result at step S111, terminating the process.

When the assignment element for performing an assignment of variables c21 and c22 is not found during the above cited process, it is determined in step S102 that the assignment element does not exist, and at step S112 it is determined that a retrieval for the final value of the variable V fails, namely, no reference exists, thereby terminating the process at this point.

Generally speaking, as multiple assignment element will be returned as a result of look up process in accordance with the partial assignment list, it becomes necessary to convert them into a appropriate representation. Such representation will be dependent of the implementation.

A process shown in FIG. 20 is described as follows. When the variable C is retrieved by using the assignment table shown in FIG. 18, FIG. 20 shows a case of the inclusion of C1 and C2 in the variable C. By searching the assignment table from the last assignment element, an assignment element for C2 is first found and then the assignment element for C1 is found. Both C1 and C2 are registered in the partial assignment list, and as both C1 and C2 are subject to the assignment with some condition, the result of the determination at step S109 is NO, thereby enabling a search for the variable C to continue. Then, the assignment element for C is found, and is registered in the partial assignment list, thereby terminating the search. The data of the assignment elements for C, C1, C2 is returned as the value designating the data item C.

The process is explained by referring to FIGS. 10, 11 and 15, when a relationship of an inclusion of the variables is not considered. However, when the inclusion relationship of the variables is considered, the assignment value of the last portion in the assignment table is changed to an appropriate expression so as to reflect the relationship of the inclusion of the variables, as shown in FIG. 16.

A process of preparing the assignment table by obtaining contents of assignment of data to be executed by the program, namely, the assignment value for the variable with its conditional expression with regard to the control flow 2B, is explained in the above description. A process of arranging the result of the above process in a suitable format and of extracting a specification of the program will be explained hereinafter.

Figure 21:
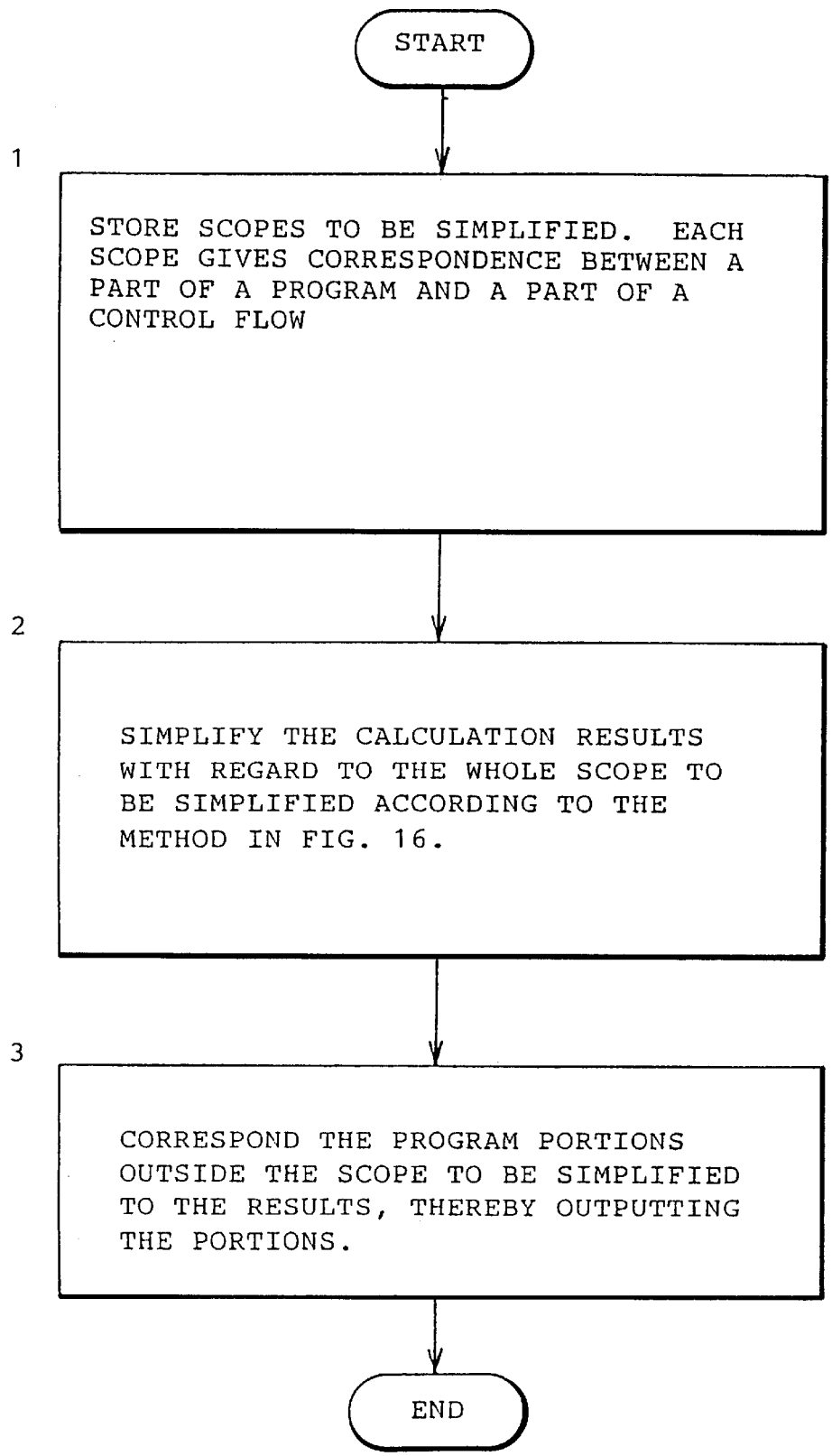
FIG. 21 shows an explanatory view of an order of processes of outputting a specification of a program by limiting a scope of the program to be simplified.

FIG. 21 shows an order of processes of restricting a scope in which the assignment value is to be obtained, and combining the obtained result with a portion of the program itself, so that a combination of the obtained data result with the part of the program itself is output. In FIG. 21, scopes in which the assignment contents or the assignment values are stored, and respective scope for obtaining them are made corresponding to the programs in the control flow B, as shown in (1). Then, the plurality of scopes in which the assignment contents, namely, the assignment value is obtained by unification as shown in (2), in accordance with the process explained in FIG. 16. The obtained result is combined with a part of a program which surrounds the scope.

Figure 22:
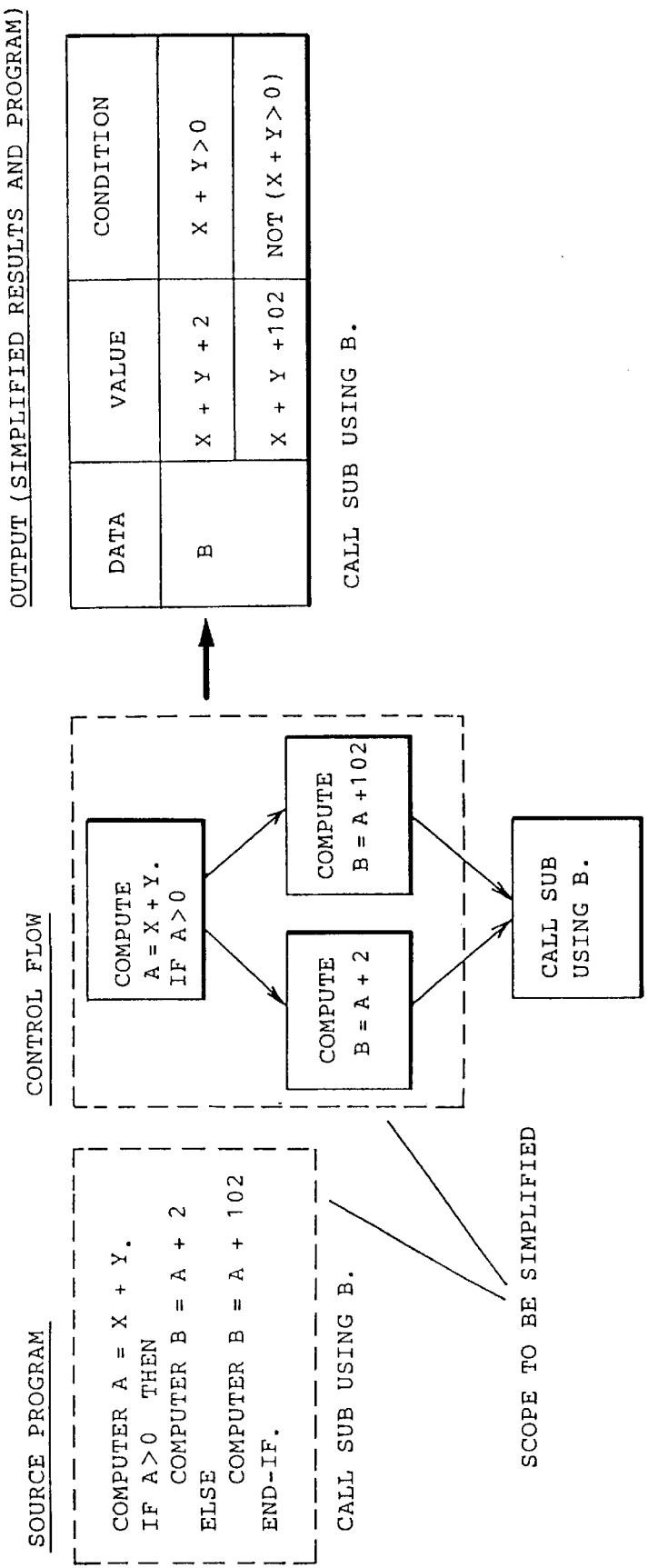
FIG. 22 shows an explanatory view of an example of a process shown in FIG. 21.

This process in FIG. 21 is carried out by the assignment table generation portion 24, based on the data prepared by the syntax analyzing portion 22, flow 2B preparing portion 23 shown in FIG. 2, and stored in working data storing portion 25, and the result of the process is stored in the assignment table storing memory 13. FIG. 22 shows an explanatory view of an example of a process shown in FIG. 21. In FIG. 22, a scope in which the assignment value is simplified is designated in the source program, and the result in the table form is combined with a program portion outside of a scope.

A function of limiting a scope in which simplification is done is necessary because analysis of the whole programs is unnecessary or difficult. For example, some programs invoked by CALL statement do not provide source code. The scope in which the assignment table is grouped or unified can be automatically determined by a system by excluding a call statement or input and output statement, or simply given by a user interactively.

Figure 23:
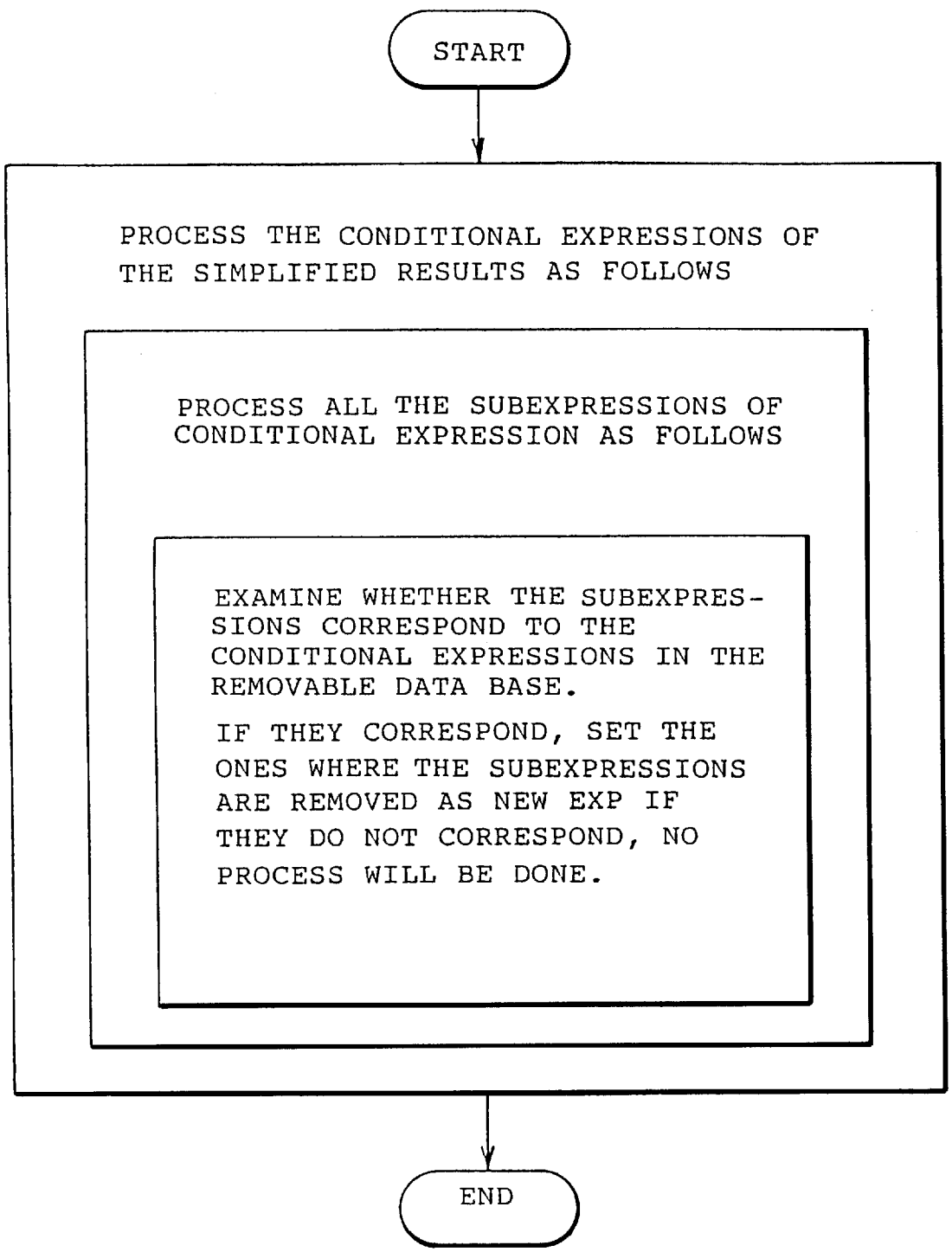
FIG. 23 shows an explanatory view of an order of processes of outputting a specification of a program by abbreviating a part of a conditional expression.

FIG. 23 shows a process of abbreviating a conditional expression by deleting a portion of a complex condition in the result obtained, in accordance with the process of FIG. 16. In FIG. 23, at (1) the process following (2) is performed for all the equations EXP obtained in the result. At (2), process (3) is performed for all the subexpressions in the conditional expression EXP. At (3) it is determined whether the respective subexpressions accord with the conditional expression stored in the database of the removable expression. In case the result is YES, it is understood that the equation can be removed and the result obtained by removing the subexpression can be expressed as a new conditional expression EXP. In case the result is NO, no process can be performed.

Figure 24:
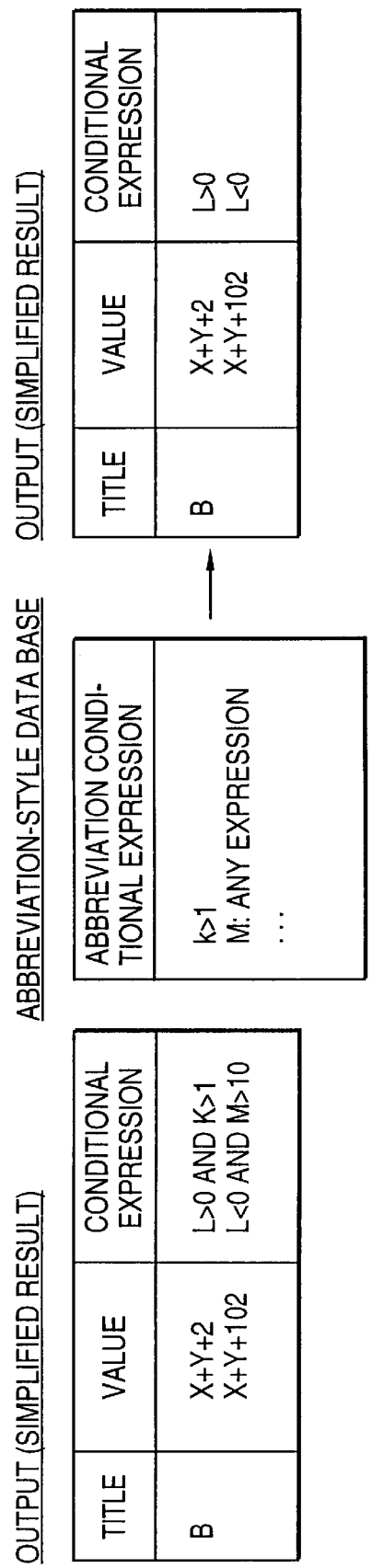
FIG. 24 shows a view of an example of a process shown in FIG. 23.

FIG. 24 is an explanatory view of an example of a process according to FIG. 23. In FIG. 24, respective conditional expressions are provided for two possible values of the name B of the data item. For example, where the value becomes X+Y+2, the conditional expression can be resolved into three subexpressions.

L>0, K>1, L>0 AND K>1

By searching whether these subexpressions accord with the conditional expressions in the database of the removable expressions, it is determined that the equation condition in which K is larger than 1 can be deleted, and thus the conditional expression obtained by removing the subexpression can be made into a new EXP, and the shortened results are provided as an output.

Any conditional expression which concern M can be deleted, thereby providing the output A content of the database of the removable equation may be input manually by a user or may be provided automatically. Some removable conditional expressions such as trivial error checking expressions or variable names may be automatically recognized.

Figure 25:
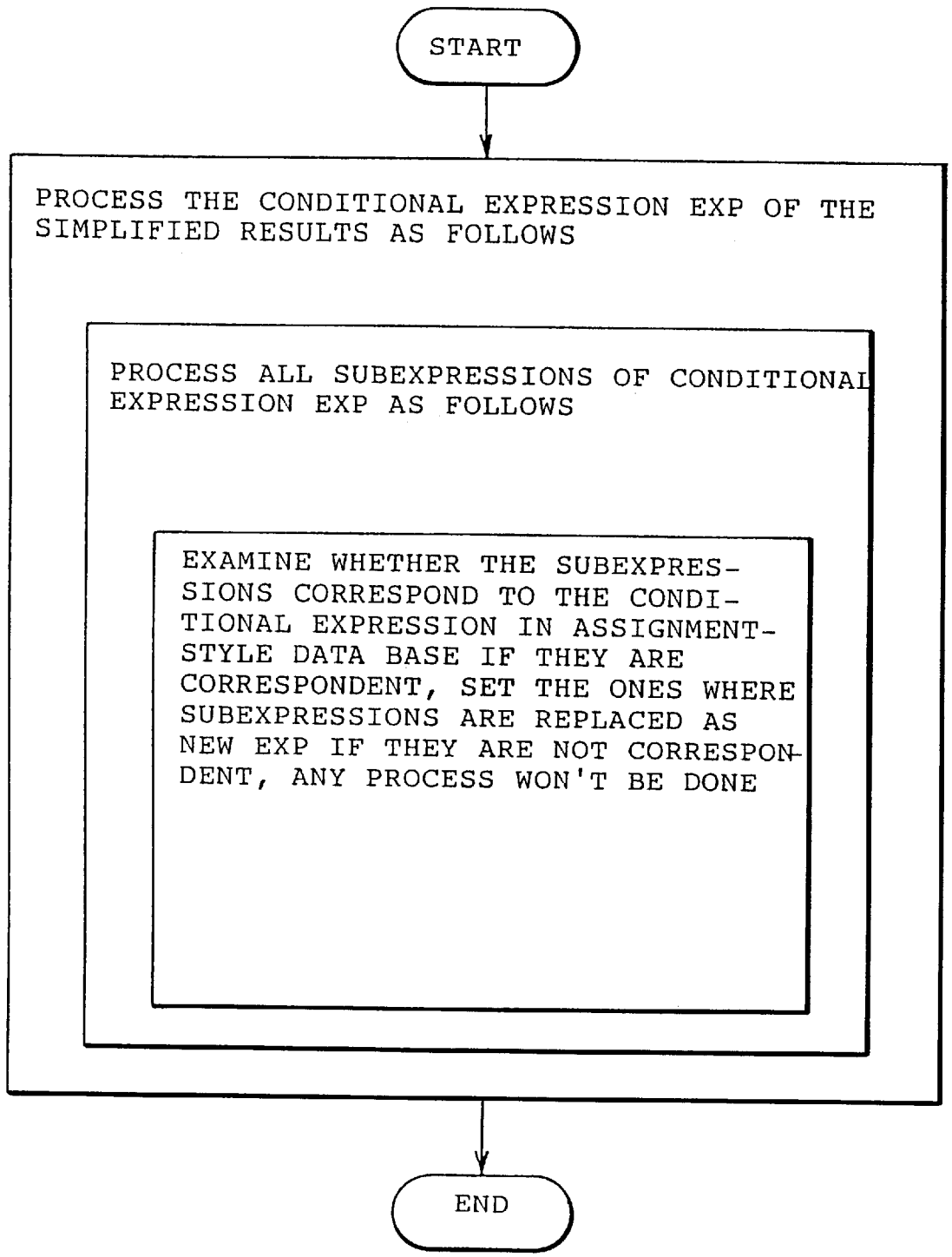
FIG. 25 shows an explanatory view of an order of processes of outputting a specification of a program by replacing a part of conditional expressions by predetermined expressions.

FIG. 25 shows a process of substituting a predetermined assignment conditional expressions as a part of the conditional expressions in the obtained result, thereby providing the assigned equation as the output. In FIG. 25, at (1) a process following (2) is performed for all the conditional expressions EXP in the obtained result. At (2), process (3) can be performed for all the subexpressions in the conditional expression EXP. It is examined at (3) whether a subexpression accords with the conditional expression in the database of the assignment expression. In case the result is YES, the equation is assigned by the designated expression, thereby providing the new conditional expression EXP. In case the result is NO, no process is performed.

Figure 26:
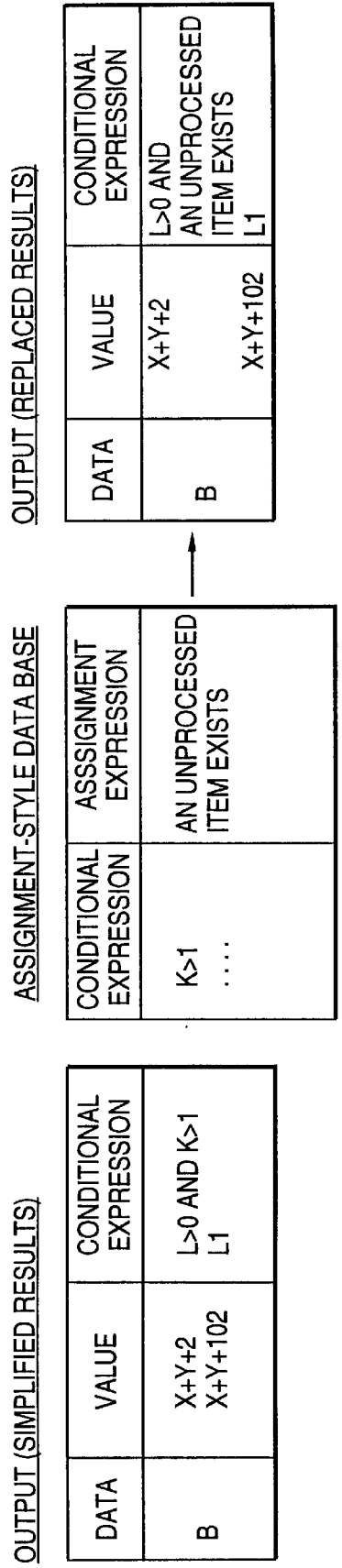
FIG. 26 shows a view of an example of a process shown in FIG. 25.

FIG. 26 shows an example of a process according to FIG. 25. L>0 AND K>1. The subexpression providing K is larger than 1 selected among the pnartial equations of the above conditional expression outputted as the unified result, is assigned by the assignment equation "an unprocessed item exists" in the database of the assignment equation, and is used for the conditional expression EXP, thereby providing the assigned result.

L>0 AND K>1

Figure 27:
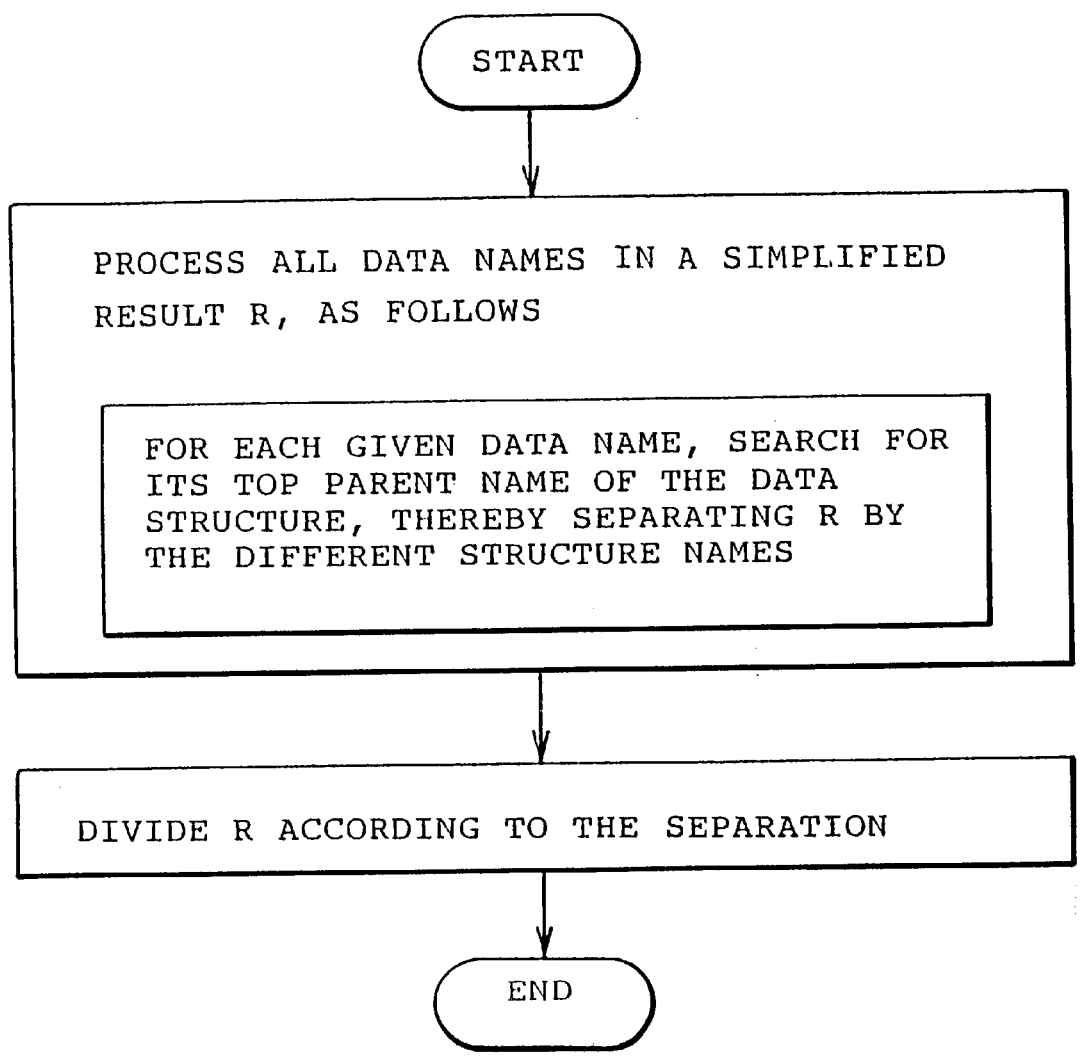
FIG. 27 shows an explanatory view of an order of processes of outputting by dividing an order of a program in accordance with its contents and outputting the divided specification.

FIG. 27 shows a process of dividing and arranging the assignment table generated in accordance with the process shown in FIG. 16, according to the data abbreviation process. In FIG. 27, at (1) a process of (2) is performed for all the data names in the obtained result of R. The name of the data provided at the highest position regarding respective data names is obtained and the assignment element in the obtained result R in accordance with the data name is classified. At (3), the results are obtained in accordance with the classification provided at (3).

FIG. 28 shows an explanatory view of an example of a process of FIG. 27. In FIG. 28, A1, A2 and A3 are included as the data items in the obtained result of R, A1 and A3 are included in the same data structure and have K as the top parent data name and A2 has the top parent data name of L. As a result, the assignment table for the data items A1 and A3, which have the top data name of K, and the assignment table for the data item A2, are separately output.

FIG. 29 shows a process of providing the data name in accordance with contents of the conditional expression. In FIG. 29 at (1), a process of (2) is performed for all the conditional expressions in the obtained result-R for example. At (2), a particular data name is classified in accordance with contents of the conditional expression. At (3), the group R is revised in accordance with a classification result of the conditional expression.

Figure 30:
FIG. 30 shows an explanatory view of an example of a process shown in FIG. 29.

FIG. 30 shows an example of a process of dividing the result in accordance with the contents of the conditional expression. The contents of the conditional expression in the obtained result R is classified as a first case in which the variable representing the kind of transaction is 1, and a second case in which it is 2. The assignment table for the case in which the kind of transaction is 1, and the assignment table for the case in which the kind of transaction is 2, are separately output.

Figure 31:
FIG. 31 shows an explanatory view of an example of a program change for outputting a specification of a program in such a state has adding a name of an entrance to the program to the program as a condition with regard to a program with entrances.

FIG. 31 shows an explanatory view of the example of the change of the program output so that the program with more than one entries can be output in a format in which the name of the respective entries is added to the assignment table as the condition when the assignment table is obtained in a process shown in FIG. 16. In FIG. 31, the original program has three entries such as main, SUB1 and SUB2, and it is changed to the program designating where the process starts by evaluating the variable "switch".

FIG. 32 is an explanatory view of a change of the control flow in accordance with the change of the program shown in FIG. 31. The original flow has three entrances. After the program is changed, the flow has a single entrance and is capable of creating an assignment table which embeds the entrance information in conditional expressions.

Figure 33:
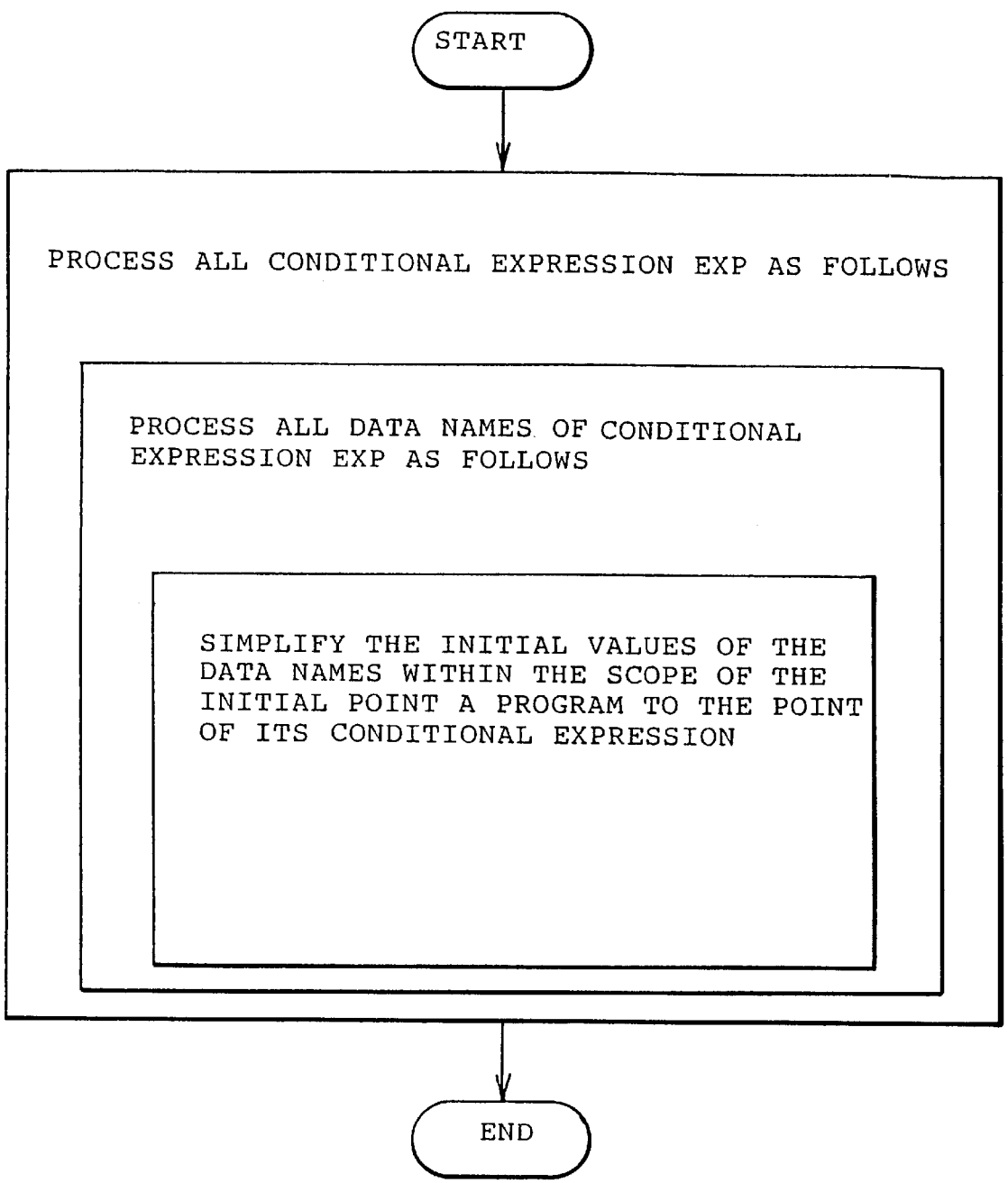
FIG. 33 shows an explanatory view of an order of processes of a putting a specification of a program by replacing a name of within an conditional expression by an initial date name used in upon an execution of the program.

FIG. 33 shows a process of simplifying the data name, namely a variable in the conditional expression in the assignment table prepared in accordance with a process shown in FIG. 16, by substituting them with an initial data name used at an execution of the program. At (1), a process following (2) is performed for all the equations EXP. At (2), a process of (3) is performed for all the data names, namely, the variable in the condition expression EXP. At (3), the value of the data name is assigned by the initial value from a starting point of the program to a point in which the equation appears.

Figure 34:
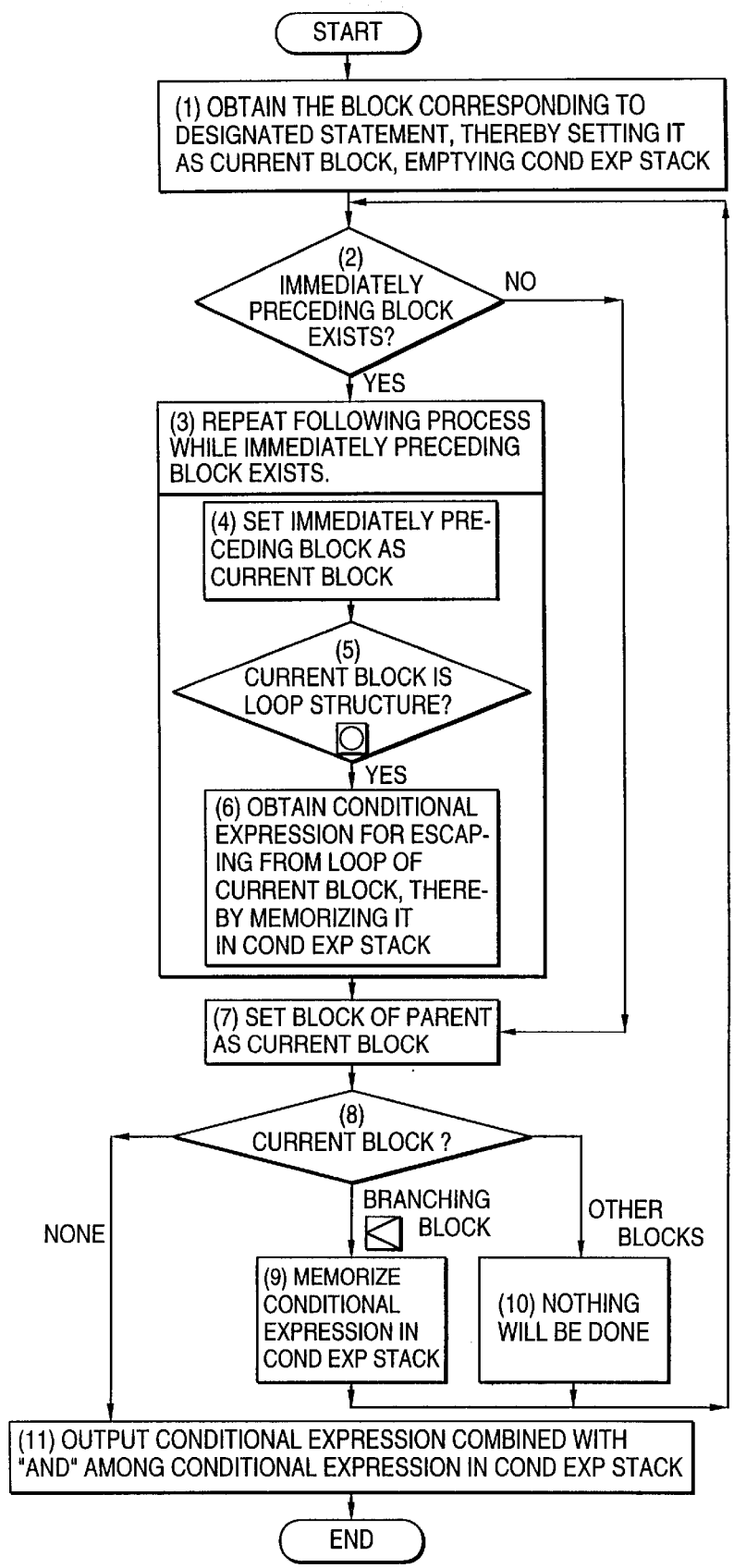
FIG. 34 shows a flow chart of a process of a extracting a conditional expression for execution of a designated statement from a program.

FIG. 34 shows a flow chart of a process of extracting a conditional expression under which a particular statement is sure to be executed. This process is executed by the conditional expression extracting portion 26 in FIG. 2, by using the working data stored in the work data storing portion 25 in accordance with an operation of the syntax analysis portion 22 and flow 2B preparing portion 23. A process shown in FIG. 34 is explained by referring to an example of the following program and its control flow (shown in FIG. 35) and using an execution trace of a process shown in FIG. 36. The subject program is as follows.

| | | |
|---|---|---|
| START. | | |
| COMPUTE I=0 | | <2> |
| LAB1. | | |
| COMPUTE I=I+1 | | <5> |
| . . . | | |

-continued

| | |
|---|---|
| IF I<10 | |
| THEN GOTO LAB1. | <8> |
| IF A>0 | |
| THEN . . . | <13> |
| ELSE . . . | <15> |
| IF B>0 | |
| THEN CALL ERROR. | <16> |
| ELSE CALL NORMAL. | <20> |

Figure 35:
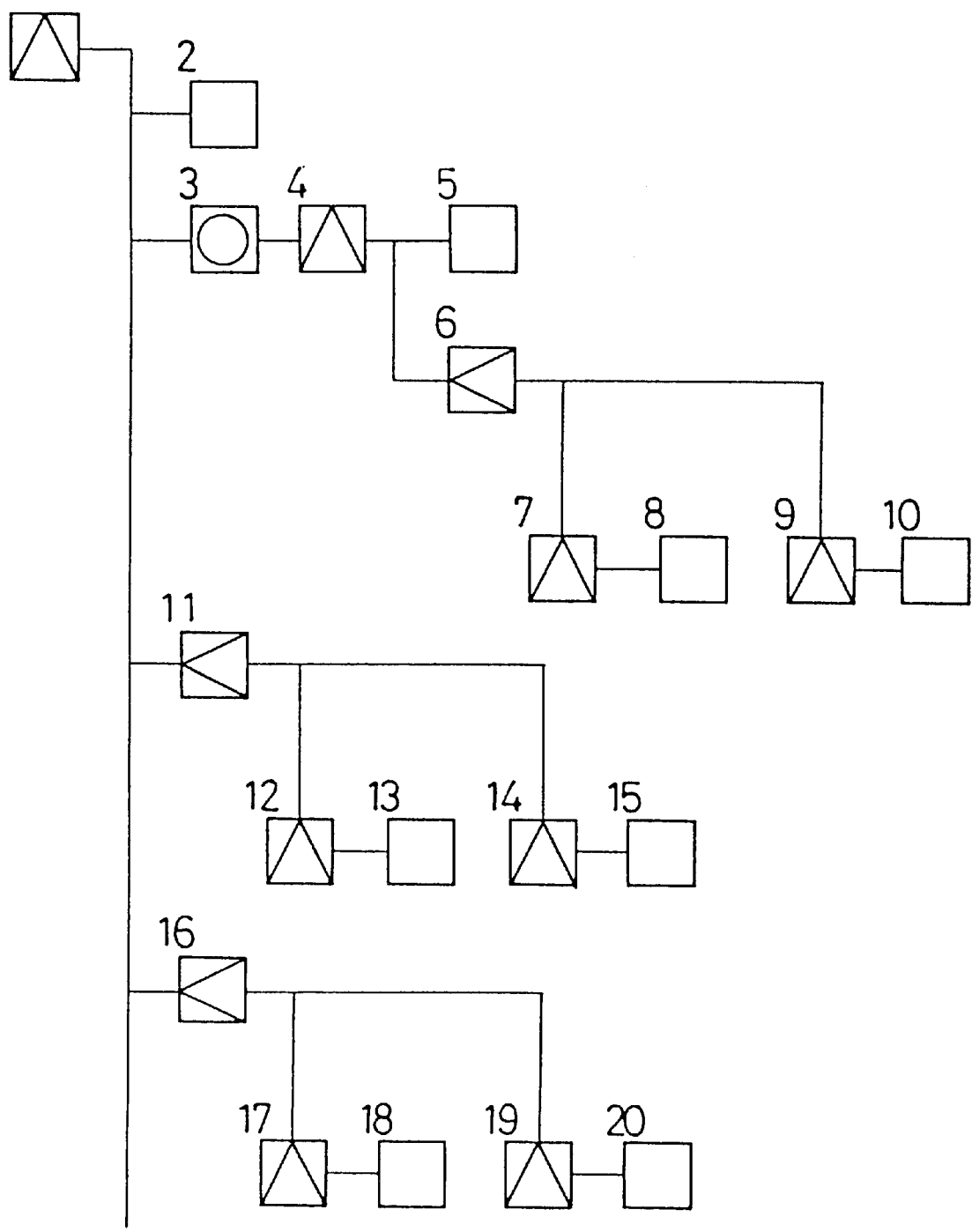
FIG. 35 shows a control flow corresponding to an example of a program of a process target in FIG. 34.

The flow 2B with the same label number to the program is shown in FIG. 35. The execution condition with regard to "CALL ERROR" appearing in the second statement from the bottom of the program is extracted. When a process shown in FIG. 34 starts, at (1), a block corresponding to the statement, the block 18 in the control flow 2B, is determined as the current block and the Cond Exp Stack is set to empty.

As shown in a first line in FIG. 36, a process for the current block 18 determines that an immediately preceding block does not exist in (2) shown in FIG. 34. The immediately preceding block means the preceding block which directly connects to the block in question. For example, in the immediately preceding block of the block 16 is the block 11, and the immediately preceding block of the block 18 doesn't exist.

The parent block, namely, the block 17, is determined as a current block at (7) in FIG. 34. The parent block represents a respective block showing a loop, a series connection, or a block connection in the internal structure of the program executing the flow. For example, the parent block of block 18 is 17, and the parent block of block 17 is 16 in FIG. 35.

As shown in FIG. 34, at (8), a current block 17 is determined as a block other than the branch block. At (10), no process is performed. Thus it is determined at (2) that the immediately preceding block does not exist, and the block 16 is deemed as the current block at (7).

In the process for determining the current block 16 in FIG. 36, the current block at (8) in FIG. 34 is judged as a branching block, and at (9) the conditional expression corresponding the branch, namely B>0 is stored in Cond Exp Stack and the process returns to (2). At (2), the immediately preceding block exists for the block 16. Therefore as the immediately preceding block exists at (3), the processes of (4) to (6) are repeated. At (4), the immediately preceding block, namely, the block 11, is deemed as the current block and at (5), it is judged whether the current block is a symbol designating the loop structure. As the current block is not the symbol designating the loop structure, no process can be performed and the immediately preceding block, namely, the block 3, is determined as the current block at (4).

A process for the current block 3 is determined to be a symbol designating a loop structure at (5) and a conditional expression for escaping from a loop designated by the current block at (6). The conditional expression for escaping from loop is stored as Cond Exp Stack in which NOT (I<10).

The equation of the escape condition from the loop is obtained in preparing the control flow of the loop. The conditional expression for escaping from the loop designated by the symbol of the block 3 is NOT (I<10) as shown in FIG. 35.

At (3) in FIG. 34, the block 2 exists as the immediately preceding block and block 2 is deemed as the current block at (4). The current block 2, at (5), is not representing the symbol of the loop structure. At (3), the immediately preceding block does not exist any more and at (7), the parent block of block 2, namely, block 1, is considered as the current block.

In the process for the current block 1, the current block is deemed as other blocks at (8) in FIG. 34 and no process can be performed at (10), thereby returning the process to be returned to (2). It is determined at (2) that the immediately preceding block does not exist and at (7), the parent block is deemed as the current block. However, in this case, the parent block, namely, the current block, does not exist and at (8), it is determined that the current block does not exist and at (11), the conditional expressions in the Cont Exp Stack are combined in AND in the logic, thereby terminating the output process. Finally, the statement for "CALL ERROR" is executed and the following conditional expression NOT (I<10) AND B>0 is output.

As described above, based on the result of the preparation of the control flow 2B, the present invention can obtain, from a program, the information at a specification level of the program such as the final value to be set to the data in the subject software and the condition AND/OR constraint in which a particular statement is executed. The obtained information can be restored as design information in a CASE repository, thereby being used for an automatic generation of the system program. Therefore the present invention can greatly contribute to a reconstruction of a system or to development of a similar system.

What is Claimed is:

1. A method of performing a reverse analysis of a program, analyzing contents of a program to be executed, and extracting a specification of a program comprising the steps of:

preparing a first control flow comprising a syntax tree obtained by performing a syntax analysis of a program and connecting blocks in the order of an execution, each of the respective blocks comprising a series of statements which are executed in a predetermined order and do not include a branch;

preparing a second control flow by finding a portion of a loop in said prepared first control flow, cutting the loop at a point of the loop, connecting said blocks designating contents of a process of said loop in a predetermined order corresponding to said cut point and connecting said connected plurality of blocks to a symbol designating the loop;

finding the portion of said second control flow which corresponds to the loop and expressing the portion corresponding to the loop in a hierarchical manner in accordance with contents of said loop;

finding a branching point and a merging point of the second control flow which are not included in said loop, and expressing said branching or merging point in a hierarchical manner in accordance with a structure of said portions not included in the loop by using a symbol of said branching merging point;

preparing a third control flow by finding a portion of said control flow which is other than said loop portion and said branching or merging portions and can be executed sequentially, and expressing said portion to be sequentially executed by using a symbol designating a sequential execution in a hierarchical manner with the hierarchical expression of said loop and the hierarchical expression of said branching or merging portions; and extracting a specification of a program by using said third control flow.

2. The method of performing a reverse analysis of a program according to claim 1, further comprising a step of preparing, in the third control flow, an assignment table obtained by extracting information of assignment operations executed in a block, replacing a reference to a variable with the value assigned to the variable in the preceding statement within the same block.

3. The method of performing a reverse analysis of a program according to claim 2, in which variables are of a structured data type.

4. The method of performing a reverse analysis of a program according to claim 1, further comprising the steps of:

preparing, in the third control flow, an assignment table obtained by extracting information of assignment operations executed in a block, replacing a reference to a variable with the value assigned to the variable in the preceding statement within another block; and merging assignment tables created by applying the procedure of building an assignment table for one block to each of the sequence of blocks connected in the order of execution, thereby generating an assignment table for the sequence of blocks.

5. The method of performing a reverse analysis of a program according to claim 1, comprising the steps of:

generating an assignment table for each of the branch paths which are represented as a subtree under the branch symbol in the third control flow and then branch path, thereby generating an assignment table for the processing during the branch path that is under the branch symbol in the third control flow.

6. The method of performing a reverse analysis of a program according to claim 1, applying additional three steps below repeatedly to generate an assignment table for a whole program represented by the overall structure of the third control flow, generating an assignment table by extracting information of assignment operations executed in a block of the third control flow, replacing a reference to a variable with the value assigned to the variable in the preceding statement within a block; and merging assignment tables created by applying the procedure of building an assignment table for one block to each of the sequence of blocks connected in the order of execution, thereby generating an assignment table for the sequence of blocks; and merging the assignment tables generated for each branch path, adding a conditional expression which represents the branch condition for a corresponding branch path, thereby generating an assignment table for the processing during the branch path that is under the branch symbol in the third control flow.

7. The method of performing a reverse analysis of a program according to claim 6, wherein a scope of an assignment table with a condition to be simplified is limited within the whole program, and an assignment table calculated for the limited scope is combined with a program which corresponds to outside of the scope, thereby providing the output.

8. The method of performing a reverse analysis of a program according to claim 6, wherein a part of a conditional expression in an assignment table is removed for simplification.

9. The method of performing a reverse analysis of a program according to claim 6, wherein a part of a conditional expression in an assignment table with conditional expressions is replaced by a predetermined expression.

10. The method of performing a reverse analysis of a program according to claim 6, wherein said conditional expression equipped with an assignment table is divided in accordance with said conditional expression or contents of the assignment operation in the assignment table.

11. The method of performing a reverse analysis of a program according to claim 6, wherein a name of an entry point to the program is added to the assignment table when the program has secondary entries.

12. The method of performing a reverse analysis of a program according to claim 6, wherein a part of the conditional expression in the assignment table with the conditional expression is assigned by the names of variables as initial data items upon execution for simplification.

13. A method of performing a reverse analysis of a program, analyzing contents of a program and extracting a specification of a program, comprising the steps of:

preparing a first control flow comprising a syntax tree obtained by performing a syntax analysis of a program and connecting blocks in the order of an execution, each respective block comprises a series of statements which are executed in a predetermined order and do not include a branch;

preparing a second control flow by finding a portion of a loop in said prepared first control flow, cutting the loop at a point of the loop, connecting said blocks designating contents of a process of said loop in a predetermined order corresponding to said cut point and connecting said connected plurality of blocks to a symbol designating the loop;

finding the portion of said second control flow which corresponds to the loop and expressing the portion corresponding to the loop in a hierarchical manner in accordance with contents of said loop;

finding a branching point and a merging point of the second control flow which are not included in said loop, and expressing said branching or merging point in a hierarchical manner in accordance with a structure of said portions not included in the loop by using a symbol of said branching merging point;

preparing a third control flow by finding a portion of said control flow which is other than said loop portion and said branching or merging portions and can be executed sequentially, and expressing said portion to be sequentially executed by using a symbol designating a sequential execution in a hierarchical manner with the hierarchical expression of said loop and the hierarchical expression of said branching or merging portions; and obtaining a conditional expression for executing a particular statement in the program by using the third control flow.

14. The method of performing a reverse analysis of a program according to claim 13, wherein a name of a variable in the conditional expression is replaced by the name of the variable as an initial data item upon execution, thereby providing the conditional expression.

15. A method of performing a reverse analysis of a program, analyzing contents of a program to be executed and extracting a specification of a program, comprising the steps of:

preparing the first control flow comprising a syntax tree obtained by performing a syntax analysis of a program and connecting blocks in the order of an execution, each respective block comprises a series of statements which are executed in a predetermined order and do not include a branch; and preparing a second control flow by finding a portion of a loop in said prepared first control flow, cutting the loop at a point of the loop, connecting said blocks designating contents of a process of said loop in a predetermined order corresponding to said cut point and connecting said connected plurality of blocks to a symbol designating the loop, thereby extracting a specification of the program by using said second control flow.

16. An apparatus for performing a reverse analysis of a program, analyzing contents of a program to be executed and extracting a specification of a program, comprising:

means for preparing a first control flow comprising a syntax tree obtained by performing a syntax analysis of a program and connecting blocks of an order of an execution, each respective block comprises a series of statements which are executed in a predetermined order and do not include a branch;

means for preparing a second control flow by finding a portion of a loop in said prepared first control flow, cutting the loop at a point of the loop, connecting said blocks designating contents of a process of said loop in a predetermined order corresponding to said cut point and connecting said connected plurality of blocks to a symbol designating the loop, thereby extracting a specification of the program by using said second control flow;

means for finding said second control flow which corresponds to the loop and expressing the portion corresponding to the loop in accordance with contents of said loop, in a hierarchical manner, finding a branching point and a merging point of the second control flow which are not included in said loop, and expressing said branching or said merging point in a hierarchical manner in accordance with a structure of said portions not included in the loop by using a symbol of said merging point;

preparing a third control flow by finding a portion of said control flow which is other than said loop portion and said branching or merging portions and can be executed sequentially, and expressing said portion to be sequentially executed by using a symbol designating a sequential execution in a hierarchical manner with the hierarchical expression of said loop and the hierarchical expression of said branching or merging portions; and extracting a specification of a program by using said third control flow.

* * * * *